US012155425B2

(12) United States Patent
Ma et al.

(10) Patent No.: US 12,155,425 B2
(45) Date of Patent: *Nov. 26, 2024

(54) UPLINK MULTI-USER EQUIPMENT (UE) COOPERATIVE TRANSMISSION

(71) Applicants: Jianglei Ma, Kanata (CA); Hua Xu, Kanata (CA); Liqing Zhang, Kanata (CA); Peiying Zhu, Kanata (CA)

(72) Inventors: Jianglei Ma, Kanata (CA); Hua Xu, Kanata (CA); Liqing Zhang, Kanata (CA); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

This patent is subject to a terminal disclaimer.

(21) Appl. No.: 17/967,217

(22) Filed: Oct. 17, 2022

(65) Prior Publication Data

US 2023/0036571 A1 Feb. 2, 2023

Related U.S. Application Data

(63) Continuation of application No. 16/844,233, filed on Apr. 9, 2020, now Pat. No. 11,476,899.

(Continued)

(51) Int. Cl.
*H04B 7/026* (2017.01)
*H04B 7/0413* (2017.01)

(52) U.S. Cl.
CPC ........... *H04B 7/026* (2013.01); *H04B 7/0413* (2013.01)

(58) Field of Classification Search
None
See application file for complete search history.

(56) References Cited

U.S. PATENT DOCUMENTS 9,055,534 B2 * 6/2015 Kim .................... H04W 52/146
9,173,110 B2 * 10/2015 Lim ...................... H04L 5/0048
(Continued)

FOREIGN PATENT DOCUMENTS

CN 1728656 A 2/2006
CN 101115045 A 1/2008
(Continued)

OTHER PUBLICATIONS

Lenovo et al., "Support of unicast, groupcast and broadcast in NR V2X", 3GPP TSG RAN WG1 Meeting #94bis, R1-1810573, Oct. 12, 2018 (Oct. 12, 2018), Section 2.1, 5 pages.
(Continued)

*Primary Examiner* — Berhanu Tadese

(57) ABSTRACT

The present disclosure relates to uplink cooperative multi-User Equipment (UE) cooperative transmission such as Multiple-Input Multiple-Output (MIMO) transmission. Source data of a source UE that is to be transmitted via uplink cooperative transmission by multiple UEs, is transmitted to at least one cooperative UE over an SL. The source data is associated with an identifier for identifying the UE to the network equipment as a source of the source data. The multiple UEs transmit the source data and the identifier in an uplink direction to the network equipment. The network equipment receives the source data from the multiple UEs in a cooperative transmission such as cooperative MIMO transmission, and obtains the identifier for identifying the source UE as the source of the source data.

25 Claims, 14 Drawing Sheets

Related U.S. Application Data

(60) Provisional application No. 62/835,725, filed on Apr. 18, 2019.

(56) References Cited

U.S. PATENT DOCUMENTS

| | | | | |
|---|---|---|---|---|
| 9,456,375 B2* | 9/2016 | Kang | | H04B 7/026 |
| 9,485,063 B2* | 11/2016 | Shattil | | H04B 7/024 |
| 9,503,171 B2* | 11/2016 | Yeh | | H04B 7/0469 |
| 9,509,461 B2* | 11/2016 | Kim | | H04W 56/0045 |
| 9,520,922 B2* | 12/2016 | Chen | | H04B 7/0632 |
| 9,641,298 B2* | 5/2017 | Kim | | H04L 5/0048 |
| 9,698,951 B2* | 7/2017 | Kim | | H04L 5/0057 |
| 9,768,842 B2* | 9/2017 | Shattil | | H04L 5/0037 |
| 9,883,540 B2* | 1/2018 | Li | | H04W 72/27 |
| 9,893,774 B2* | 2/2018 | Shattil | | H04W 24/00 |
| 10,237,906 B2* | 3/2019 | Ou | | H04W 8/005 |
| 10,439,680 B2* | 10/2019 | Chen | | H04B 7/024 |
| 11,239,891 B2* | 2/2022 | Xue | | H04W 8/24 |
| 11,476,899 B2* | 10/2022 | Ma | | H04B 7/026 |
| 2011/0002406 A1* | 1/2011 | Ming | | H04L 25/03343 375/260 |
| 2012/0039419 A1* | 2/2012 | Maddah-Ali | | H04L 25/03343 375/340 |
| 2012/0140660 A1* | 6/2012 | Kang | | H04L 5/0048 370/312 |
| 2014/0029424 A1* | 1/2014 | Callard | | H04L 47/323 370/235 |
| 2014/0098731 A1* | 4/2014 | Maaref | | H04W 76/40 370/312 |
| 2015/0023275 A1* | 1/2015 | Kim | | H04W 56/0045 370/329 |
| 2015/0026527 A1* | 1/2015 | Hou | | H04L 1/24 714/706 |
| 2015/0146644 A1* | 5/2015 | Kim | | H04L 5/0023 370/329 |
| 2015/0163837 A1* | 6/2015 | Li | | H04W 76/11 370/329 |
| 2015/0270882 A1* | 9/2015 | Shattil | | H04B 7/024 370/329 |
| 2015/0303950 A1* | 10/2015 | Shattil | | H04B 1/0003 370/328 |
| 2016/0006707 A1* | 1/2016 | Ying | | H04W 88/04 713/153 |
| 2016/0081109 A1* | 3/2016 | Li | | H04W 72/569 370/329 |
| 2016/0338095 A1* | 11/2016 | Faurie | | H04W 72/20 |
| 2017/0013577 A1* | 1/2017 | Berggren | | H04W 72/1215 |
| 2017/0054480 A1* | 2/2017 | Shattil | | H04B 7/024 |
| 2017/0078945 A1* | 3/2017 | Ma | | H04W 76/11 |
| 2017/0126458 A1* | 5/2017 | Shattil | | H04L 27/2615 |
| 2017/0171899 A1* | 6/2017 | Seo | | H04W 88/04 |
| 2017/0257898 A1* | 9/2017 | Maaref | | H04W 8/186 |
| 2017/0318586 A1* | 11/2017 | Wang | | H04L 5/0082 |
| 2017/0339530 A1* | 11/2017 | Maaref | | H04L 5/0055 |
| 2018/0139741 A1* | 5/2018 | Wang | | H04L 45/74 |
| 2018/0176955 A1* | 6/2018 | Salem | | H04W 74/0808 |
| 2018/0227882 A1* | 8/2018 | Freda | | H04W 8/005 |
| 2018/0262237 A1* | 9/2018 | Chen | | H04B 7/0632 |
| 2018/0310358 A1* | 10/2018 | Li | | H04W 76/30 |
| 2019/0020381 A1* | 1/2019 | Tooher | | H04W 88/04 |
| 2019/0068274 A1* | 2/2019 | Han | | H04B 7/14 |
| 2019/0075430 A1* | 3/2019 | Lincoln | | H04W 24/10 |
| 2019/0116608 A1* | 4/2019 | Kim | | H04W 72/1263 |
| 2019/0182644 A1* | 6/2019 | Zheng | | H04W 72/23 |
| 2019/0246385 A1* | 8/2019 | Lin | | H04L 5/0094 |
| 2019/0253927 A1* | 8/2019 | Mok | | H04W 28/0268 |
| 2019/0261216 A1* | 8/2019 | Lee | | H04W 72/20 |
| 2019/0274054 A1* | 9/2019 | Salem | | H04L 12/189 |
| 2019/0289615 A1* | 9/2019 | Lee | | H04W 36/06 |
| 2019/0342910 A1* | 11/2019 | Cao | | H04L 5/0091 |
| 2019/0357305 A1* | 11/2019 | Su | | H04W 88/04 |
| 2020/0045724 A1* | 2/2020 | Lu | | H04W 72/23 |
| 2020/0077434 A1* | 3/2020 | Kim | | H04W 72/0446 |
| 2020/0092692 A1* | 3/2020 | Wang | | H04W 76/14 |
| 2020/0107218 A1* | 4/2020 | Wang | | H04W 36/18 |
| 2020/0145867 A1* | 5/2020 | Tseng | | H04B 7/0617 |
| 2020/0146044 A1* | 5/2020 | Maaref | | H04W 72/02 |
| 2020/0153574 A1* | 5/2020 | Shin | | H04W 4/40 |
| 2020/0169956 A1* | 5/2020 | Sun | | H04W 84/04 |
| 2020/0169984 A1* | 5/2020 | Lee | | H04W 4/40 |
| 2020/0229156 A1* | 7/2020 | Park | | H04L 5/0051 |
| 2020/0235876 A1* | 7/2020 | Xu | | H04L 5/0048 |
| 2020/0236656 A1* | 7/2020 | Cao | | H04W 76/27 |
| 2020/0236712 A1* | 7/2020 | Kwak | | H04L 5/0053 |
| 2020/0259600 A1* | 8/2020 | Cao | | H04L 1/0057 |
| 2020/0267750 A1* | 8/2020 | Park | | H04W 72/0446 |
| 2020/0267790 A1* | 8/2020 | Kim | | H04W 48/16 |
| 2020/0275413 A1* | 8/2020 | Zhang | | H04W 80/02 |
| 2020/0275425 A1* | 8/2020 | Cao | | H04L 1/0003 |
| 2020/0288432 A1* | 9/2020 | Min | | H04W 4/40 |
| 2020/0288435 A1* | 9/2020 | Kwak | | H04L 5/0094 |
| 2020/0288486 A1* | 9/2020 | Kwak | | H04L 5/0094 |
| 2020/0296738 A1* | 9/2020 | Inokuchi | | H04W 72/21 |
| 2020/0296745 A1* | 9/2020 | Inokuchi | | H04W 72/566 |
| 2020/0305134 A1* | 9/2020 | Noh | | H04L 5/0092 |
| 2020/0305165 A1* | 9/2020 | Inokuchi | | H04W 88/04 |
| 2020/0314669 A1* | 10/2020 | Lee | | H04W 76/19 |
| 2020/0314727 A1* | 10/2020 | Xu | | H04L 47/32 |
| 2020/0314796 A1* | 10/2020 | Lee | | H04W 68/02 |
| 2020/0314939 A1* | 10/2020 | Park | | H04W 72/12 |
| 2020/0314940 A1* | 10/2020 | Park | | H04W 76/18 |
| 2020/0336178 A1* | 10/2020 | Ma | | H04B 7/0452 |
| 2020/0404663 A1* | 12/2020 | Zhang | | H04W 76/11 |
| 2021/0014813 A1* | 1/2021 | Kim | | H04W 8/00 |
| 2021/0211169 A1* | 7/2021 | Xue | | H04W 16/28 |
| 2023/0036571 A1* | 2/2023 | Ma | | H04B 7/0413 |

FOREIGN PATENT DOCUMENTS

| | | | | |
|---|---|---|---|---|
| CN | 101115045 B | | 5/2010 | |
| CN | 102487315 A | | 6/2012 | |
| CN | 102907041 A | | 1/2013 | |
| CN | 102932044 A | | 2/2013 | |
| CN | 101998441 B | * | 4/2013 | |
| CN | 102487315 B | | 9/2014 | |
| CN | 107079416 A | * | 8/2017 | H04B 7/026 |
| CN | 104488341 B | * | 6/2018 | H04W 72/1268 |
| CN | 109156037 A | | 1/2019 | |
| EP | 3240354 A1 | * | 11/2017 | H04B 7/026 |
| EP | 3297180 A4 | * | 6/2018 | H04B 7/024 |
| EP | 3297180 B1 | * | 11/2019 | H04B 7/024 |
| WO | WO-2012119389 A1 | * | 9/2012 | G06F 21/10 |
| WO | 2013081208 A1 | | 6/2013 | |
| WO | WO-2013125841 A1 | * | 8/2013 | H04J 11/0053 |
| WO | 2015163798 A1 | | 10/2015 | |
| WO | 2016155018 A1 | | 10/2016 | |
| WO | WO-2016180054 A1 | * | 11/2016 | H04B 7/024 |
| WO | WO-2017198175 A1 | * | 11/2017 | H04L 27/26 |
| WO | 2019007491 A1 | | 1/2019 | |

OTHER PUBLICATIONS

Zte et al., "Support of unicast and groupcast in NR Sidelink", 3GPP TSG RAN WG2 Meeting #104, R2-1816995, Nov. 16, 2018 (Nov. 16, 2018), whole document, 4 pages.

* cited by examiner

UPLINK MULTI-USER EQUIPMENT (UE) COOPERATIVE TRANSMISSION

CROSS-REFERENCE TO RELATED APPLICATION

The present application is a continuation of U.S. patent application Ser. No. 16/844,233, filed on Apr. 9, 2020 and entitled "UPLINK MULTI-USER EQUIPMENT (UE) COOPERATIVE TRANSMISSION", which claims the benefit of U.S. Provisional Application No. 62/835,725, filed on Apr. 18, 2019, entitled "UPLINK COOPERATIVE MULTI-USER EQUIPMENT (UE) MULTIPLE-INPUT MULTIPLE-OUTPUT (MIMO)", the entire contents of both of which are incorporated herein by reference.

FIELD

This application relates generally to uplink (UL) communications in a wireless communication network, and in particular to multi-User Equipment (UE) cooperative transmission, such as cooperative Multiple-Input Multiple-Output (MIMO) transmission, for uplink communications.

BACKGROUND

MIMO can enhance downlink (DL) data throughput and coverage for communications from network equipment to UEs. However, UE experience on DL (for communications from network equipment to UE) and UL (for communications from UEs to network equipment) is not symmetric. As a result, UL throughput and coverage is a bottleneck for wireless communications and a DL MIMO solution may not be easily adapted for UL. New Radio (NR) and future wireless communications may require much better UL throughput and coverage.

SUMMARY

How to significantly enhance UL UE experience is a challenge. UL cooperative transmission as disclosed herein, including cooperative multi-UE MIMO transmission, may provide a new approach to address this issue. Instead of relying on uplink communications between each individual UE and network equipment, multiple UEs cooperatively communicate with network equipment in the uplink direction. Such cooperative uplink communications could be considered a form of communications between network equipment and a "virtual" UE that consists of multiple physical UEs in a UE cooperation group or cooperative group, and can take advantage of joint efforts from those multiple UEs. UEs that belong to a virtual UE cooperation group share data through one or more sidelinks (SLs). The present disclosure proposes different types of cooperative UL transmission, including cooperative multi-UE MIMO transmission, for throughput enhancement and/or coverage enhancement for example.

A method according to one aspect of the present disclosure is performed by a first UE, and involves transmitting, to a second UE over a sidelink, data from the first UE that is to be transmitted via cooperative transmission in an uplink direction to network equipment in a communication network. The cooperative transmission is by multiple UEs including at least the second UE. The data is associated with an identifier for identifying the first UE to the network equipment as a source of the data transmitted by the second UE to the network equipment.

Another method performed by a first UE involves receiving, over a sidelink, data from a second UE that is to be transmitted via cooperative transmission in an uplink direction to network equipment in a communication network, and transmitting the data to the network equipment. The cooperative transmission is by multiple UEs including at least the first UE, and the data is associated with an identifier for identifying the second UE to the network equipment as a source of the data.

The present disclosure also includes a method performed by network equipment in a communication network. Such a method may include receiving, from multiple UEs, a cooperative transmission, by the multiple UEs, of source data from a source UE; and obtaining an identifier for identifying the source UE to the network equipment as a source of the source data.

Another aspect of the present disclosure relates to a method performed by a UE. In an embodiment, the method involves transmitting, by a first UE to a second UE over an SL, data from the first UE that is to be transmitted via cooperative MIMO transmission by multiple UEs including at least the second UE in an uplink direction to network equipment in a communication network. The data is associated with an identifier for identifying the UE to the network equipment as a source of the data transmitted by the second UE to the network equipment.

In another embodiment, a method performed by a UE involves receiving, by a first UE over an SL, data from a second UE that is to be transmitted via cooperative MIMO transmission by multiple UEs including at least the first UE in an uplink direction to network equipment in a communication network; and transmitting, by the first UE to the network equipment, the data and an identifier for identifying the source UE to the network equipment as a source of the source data in a transmission of the source data by the UE to the network equipment.

A method according to a further embodiment is performed by network equipment in a communication network, and involves receiving, from multiple user equipment (UEs), a cooperative multiple-input multiple-output (MIMO) transmission, by the multiple UEs, of source data from a source UE; and obtaining, by the network equipment, an identifier for identifying the source UE to the network equipment as a source of the source data.

An apparatus embodiment relates to a UE that includes a processor; and a non-transitory computer readable storage medium storing programming for execution by the processor, the programming including instructions to perform a UE method as disclosed herein. For example, in an embodiment a method involves transmitting data from the UE to a second UE over a sidelink. That data is to be transmitted via cooperative transmission by multiple UEs including at least the second UE in an uplink direction to network equipment in a communication network. The data is associated with an identifier for identifying the UE to the network equipment as a source of the data transmitted by the second UE to the network equipment. In another embodiment a method involves receiving data from a second UE over a sidelink. The data is to be transmitted via cooperative transmission by multiple UEs including at least the UE, in an uplink direction to network equipment in a communication network. A method may also involve transmitting the data to the network equipment. The data is associated with an identifier for identifying the second UE to the network equipment as a source of the data.

Network equipment, according to an embodiment, includes a processor; and a non-transitory computer readable storage medium storing programming for execution by the processor, the programming including instructions to perform a network equipment method as disclosed herein. For example, in an embodiment a method involves receiving, from multiple UEs, a cooperative transmission, by the multiple UEs, of source data from a source UE; and obtaining an identifier for identifying the source UE to the network equipment as a source of the source data.

A computer program product according to some embodiments includes a non-transitory computer readable storage medium storing programming, the programming including instructions to perform a UE method as disclosed herein.

Another embodiment of a computer program product includes a non-transitory computer readable storage medium storing programming, the programming including instructions to perform a network equipment method as disclosed herein.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

As noted above, how to significantly enhance UL UE experience remains a challenge. For example, compared to network equipment such as base stations, UEs have relatively low transmit power, and increasing transmit power is not a feasible option to increase UL throughput or coverage. Although MIMO could potentially be useful for throughput enhancement and/or coverage enhancement, adding antenna elements to a UE to support a higher level or dimension of MIMO transmission is less feasible in a UE than at a base station, at least because of physical space limitations in the UE. Moreover, even if UEs (which typically include one or two antenna elements) become enhanced with more antenna elements, UL MIMO performance will still be hampered by other inherent physical constraints of the UE, such as power, antenna separation and isolation, and user ergonomics.

UL cooperative transmission techniques as disclosed herein, such as multi-UE MIMO, may provide a new uplink communication approach in which multiple UEs cooperatively communicate with network equipment. UE cooperation can provide more total UL transmit power, using more total antennas. UE cooperation can also provide better diversity through uncorrelated antennas from different UEs located in different locations. A UE with better Signal to Noise Ratio (SNR) can also act as a rely node to relay the data from a UE with worse SNR.

For example, in some embodiments a virtual UE is formed by a group of UEs in a cooperation group. A determination as to whether each UE is to be part of a virtual UE could be made at each UE, at a network-side device, or at a combination of UE-side and network-side devices. A Source UE (SUE) that has source data to be transmitted in the uplink direction shares that source data with one or more Cooperating UEs (CUEs) through direct or multi-hop UE-to-UE communications, over one or more sidelinks (SLs). The CUE(s), and also the SUE in some embodiments, then transmit the source data cooperatively to network equipment, such as via cooperative MIMO.

Figure 1:
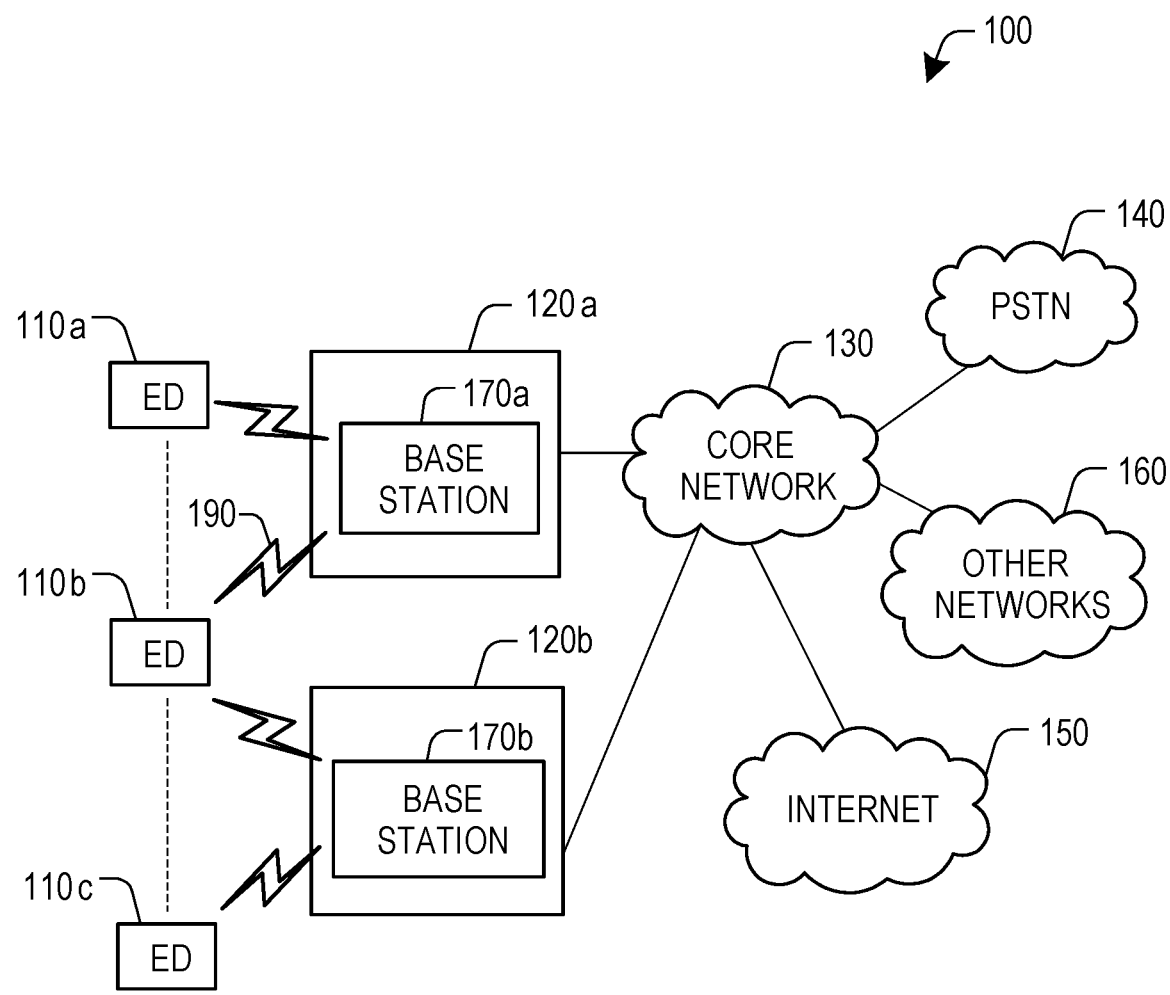
FIG. 1 illustrates an example communication system in which aspects of the present disclosure are implemented in some embodiments.

FIG. 1 illustrates an example communication system 100 in which aspects of the present disclosure are implemented in some embodiments. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a User Equipment/device (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a Base Transceiver Station (BTS), a Node-B (NodeB), an evolved NodeB (eNodeB), a Home eNodeB, a gNodeB or gNB (sometimes called a "gigabit" NodeB), a Transmission Point (TP), a Transmit/Receive Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, µWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations using the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and are represented by dashed lines in FIG. 1. UEs communicate with each other over SLs to enable UE cooperation in some embodiments. The present disclosure focuses primarily on UE cooperation in UL communications. In contrast to UL UE cooperation, DL UE cooperation involves network equipment such as a gNB sending data for a Target UE (TUE) to the TUE and CUE(s). Each CUE then sends, to the TUE, received data that is destined for the TUE. A TUE ID is used to indicate the destination of a DL data packet to the CUE(s) so that the CUE(s) can identify DL data packets that are to be sent to the TUE.

For UL cooperative transmission in accordance with the present disclosure, such as Multi-UE (MU) MIMO communications, source data from one UE, referred to herein as an SUE, is cooperatively transmitted to network equipment such as a gNB. Reception of the source data at the network equipment involves identifying the SUE and combining transmissions received from multiple UEs to recover the source data.

In non-cooperative UL MU-MIMO, each UE transmits its own source data to network equipment. This is significantly different from cooperative UL transmission such as cooperative UL MU-MIMO as disclosed herein, in that the participating UEs all transmit at least portion of source data from one SUE. The UEs may transmit the same or different portions of the source data, but at least portion of all transmitted source data originates from a single SUE that shares the source data among multiple UEs that are participating in UL cooperative transmission.

Figure 2:
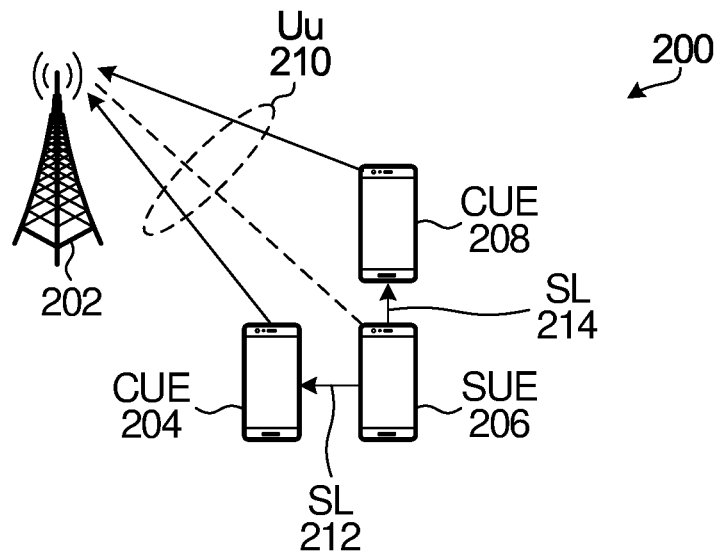
FIG. 2 is a block diagram of another example communication system illustrating UL cooperative multi-UE transmission according to an embodiment.

FIG. 2 is a block diagram of another example communication system illustrating UL cooperative multi-UE transmission according to an embodiment. In the present disclosure, multi-UE MIMO is used as an example of cooperative transmission, but it should be appreciated that this is intended to be a non-limiting example. The techniques herein may be applied to other types of cooperative transmission that may or may not necessarily be classified as or otherwise considered to be MIMO transmission.

The example system 200 includes network equipment 202 and UEs including CUEs 204, 208 and an SUE 206. UL communications between the UEs 204, 206, 208 and the network equipment 202 are through an interface shown as "Uu" 210 in FIG. 2, and SL communications directly between the UEs are through SLs 212, 214. Examples of these components and implementation options for communications between these components are provided elsewhere herein.

For UL UE cooperation, the SUE 206 shares its own source data that is to be sent to network equipment 202 with the CUEs 204, 208 through the SLs 212, 214. The CUEs 204, 208 send the source data, received from the SUE 206, to the network equipment 202 to thereby assist the SUE in UL communications. An SUE ID is used in some embodiments to indicate the source of UL data packets that are transmitted by each CUE 204, 208 to the network equipment 202. Instead of each CUE 204, 208 transmitting its own data independently, the CUEs in this example transmit the source data of the SUE 206. In this manner, the CUEs 204, 208 cooperate with the SUE 206 to assist the SUE in its UL communications. The SUE 206 also transmits its source data to the network equipment 202 in some embodiments. In other embodiments, the SUE 206 splits or distributes its source data to the CUEs 204, 208 but does not itself transmit the source data to the network equipment 202.

The present disclosure proposes embodiments for performing UL transmission such as MU-MIMO cooperatively, designs for closed loop (CL) and open loop (OL) UL cooperative transmission such as MU-MIMO, and signaling mechanisms for supporting UL cooperative transmission such as MU-MIMO. Each of these aspects are discussed in detail herein.

Figure 3:
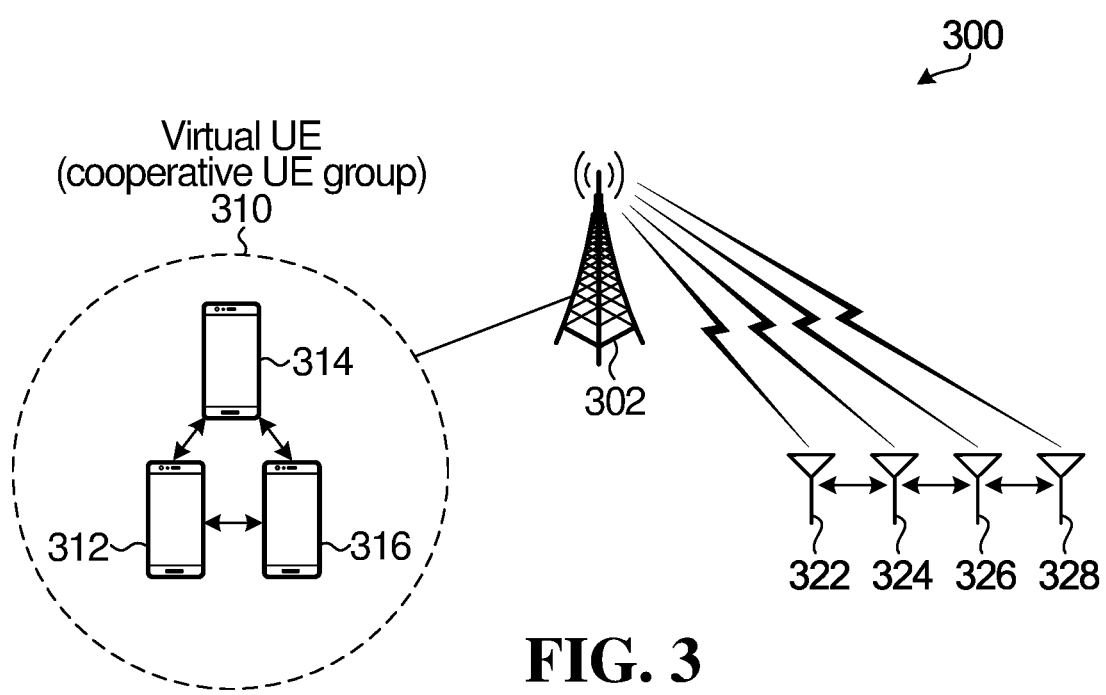
FIG. 3 is a block diagram illustrating another representation of UL cooperative multi-UE transmission according to an embodiment.

FIG. 3 is a block diagram illustrating another representation of UL cooperative transmission such as multi-UE MIMO according to an embodiment. FIG. 3 shows a communication system 300 including network equipment 302 and UEs 312, 314, 316. Examples of these components are provided elsewhere herein. For example, the network equipment 302 is a TRP, such as gNB, in some embodiments.

A virtual UE 310, formed by a UE group that includes the UEs 312, 314, 316, cooperatively communicates with network equipment 302. Several embodiments of such cooperative communication are disclosed herein. FIG. 3 also illustrates, at 322, 324, 326, 328, individual antenna elements that are intended to provide an additional representation of UL cooperative transmission such as cooperative MU-MIMO transmission from the UEs 312, 314, 316 and reception of respective signals from those antenna elements by the network equipment 302. The antenna elements 322, 324, 326, 328 illustrate another cooperation embodiment, and represent antenna elements of single-antenna devices, such as low end sensors for example.

According to a closed loop cooperative UL virtual MIMO embodiment for throughput enhancement, data to be transmitted originates from a single UE, specifically an SUE. Multiple UEs, including at least one CUE and possibly the SUE, transmit the same or different data streams from the SUE independently.

Closed loop cooperative joint precoding based UL MU-MIMO is suitable at least for fixed devices (such as sensors, video monitors, for example) in some embodiments.

For coverage enhancement according to an embodiment, transmission of the same data streams between UEs is used for UL MU-MIMO. For throughput enhancement according to an embodiment, transmission of different data streams between UEs is used for UL MU-MIMO.

Open loop cooperative MU-MIMO is also possible, for application to high speed UE groups for example. In some embodiments, open loop cooperative MU-MIMO provides a simpler solution to throughput or coverage enhancement, with less measurement efforts and signaling/feedback overhead compared to closed-loop approaches.

In a hybrid approach, different UL cooperative MU-MIMO schemes are applied together. For example, in an embodiment a first transmission is based on joint precoding and a retransmission is based on cooperative virtual MU-MIMO. In another embodiment, a first retransmission and a second retransmission apply different cooperative MIMO approaches. Another hybrid option involves different numbers of UEs participating in a first transmission and one or more retransmissions. Yet another example for hybrid operation involves adaptation between OL cooperative virtual MIMO and CL cooperative virtual MIMO. In some embodiment initial data transmission and retransmission apply different cooperative MIMO modes.

Very briefly comparing these approaches, in UL cooperative virtual MIMO, each UE can perform MIMO individually without a need for joint precoding calculation and signaling, and there is also no need for channel measurement sharing through SL communications. UL joint precoding based cooperative MU-MIMO takes advantage of more equivalent transmit antenna ports by performing MIMO jointly across all antenna ports of all cooperative UEs, and an SUE in some embodiments, and as a result better performance can be achieved (for example, better UL beamforming gain may be achieved due to more transmit antennas on the UE side). UL open loop cooperative MU-MIMO generally involves simpler deployment with less measurement and feedback/signaling, trying to take advantage of, e.g., spatial diversity from different UE locations. The hybrid scheme can achieve an effective tradeoff between performance and complexity/overhead.

For the purposes of the present disclosure, it is presumed that those skilled in the art are familiar with MIMO, and concepts such as precoding and determining or otherwise obtaining precoding matrices or parameters based on channel measurements.

It should also be appreciated that these example approaches, and other embodiments herein, refer to MIMO solely for illustrative purposes and are applicable to other types of cooperative transmission.

Considering closed loop cooperative UL transmission such as virtual MIMO in more detail, an SUE shares source data, which is to be sent to network equipment, with one or more CUE(s) via one or more SLs. Examples of communications via an SL include in band, wherein the spectrum band used for SL is a portion of the spectrum band used for the communications between network and UE, and out-of-band (for example, WiFi or High Frequency (HF)), wherein the spectrum band used for SL is different from the spectrum band used communications between network and UE. In some embodiments, the CUE(s), and possibly the SUE, perform MIMO operations to transmit the source data through UL cooperative MU-MIMO.

In some embodiments, network equipment performs channel measurements, based on separate Sounding Reference Signals (SRSs) that are received separately from UEs that are participating in the UL cooperative transmission such as cooperative MU-MIMO transmission. The participating UEs include the SUE in some embodiments. In other embodiments, the participating UEs are CUEs and the SUE does not participate in the UL cooperative transmission such as cooperative MU-MIMO transmission.

In other embodiments, network equipment can assign or configure different demodulation reference signals (DMRSs, or demodulation pilots) for the participating UEs with cooperative transmissions such as MU-MIMO transmissions (e.g., different initialized DMRS sequences to different UEs transmitting cooperatively). In one embodiment, the assignment of the demodulation reference signals configured for the participating UEs can be associated with the SRSs of the participating UEs for channel measurements; thus, the co-location or associated information between the reference signal(s) and the SRS(s) of the same UE can be exploited to improve the channel measurement.

In some embodiments, the number of data streams to be transmitted is adapted based on the channel measurements. Furthermore, the UE group, including the SUE and the CUE(s), may be configured such that only single UE of the group transmits over any assigned time-frequency resource. In other words, each UE in the cooperative UE group will transmit cooperatively over different time-frequency resources.

Based on the channel measurements, the network equipment determines one or more transmission parameters and signals the parameter(s) to the participating UEs. Examples of transmission parameters include MIMO rank and Precoding Matrix Indicator (PMI). Each participating UE performs UL transmission according to the received parameter(s). Cooperative transmission, including MIMO transmission for example, is cooperative in the sense that all participating UEs transmit source data of the source UE, but each participating UE independently transmits the SUE source data using precoding for data transmission over only its own set of antennas.

An identifier of the SUE, such as an SUE ID, may be included in each data transmission explicitly, wherein an additional ID associated with SUE is carried together with data. An identifier may be included or provided implicitly, wherein the UE ID can be identified via a scrambling sequence or other UE specific sequence associated with the SUE. Another option for providing an SUE identifier to a receiver is separately signaling an explicit or implicit indication of the identifier. Explicit or implicit signaling may also or instead be used for each retransmission, if any, of the source data by each participating UE. Such signaling is transmitted by participating UEs to enable a receiver such as network equipment to identify the SUE as the source of the source data.

All participating UEs, whether the SUE or a CUE, transmit the source data of the SUE. The same portion or block of the SUE source data, different portions or blocks of the SUE source data, or different redundancy versions (RVs) of the same portion or block of the SUE source data, for example, could be transmitted by the participating UEs.

In some embodiments, an identifier of the SUE, such as an SUE ID, can be indicated through a control channel, by one or more participating UEs to the network equipment for the cooperative transmissions for example.

Figure 4:
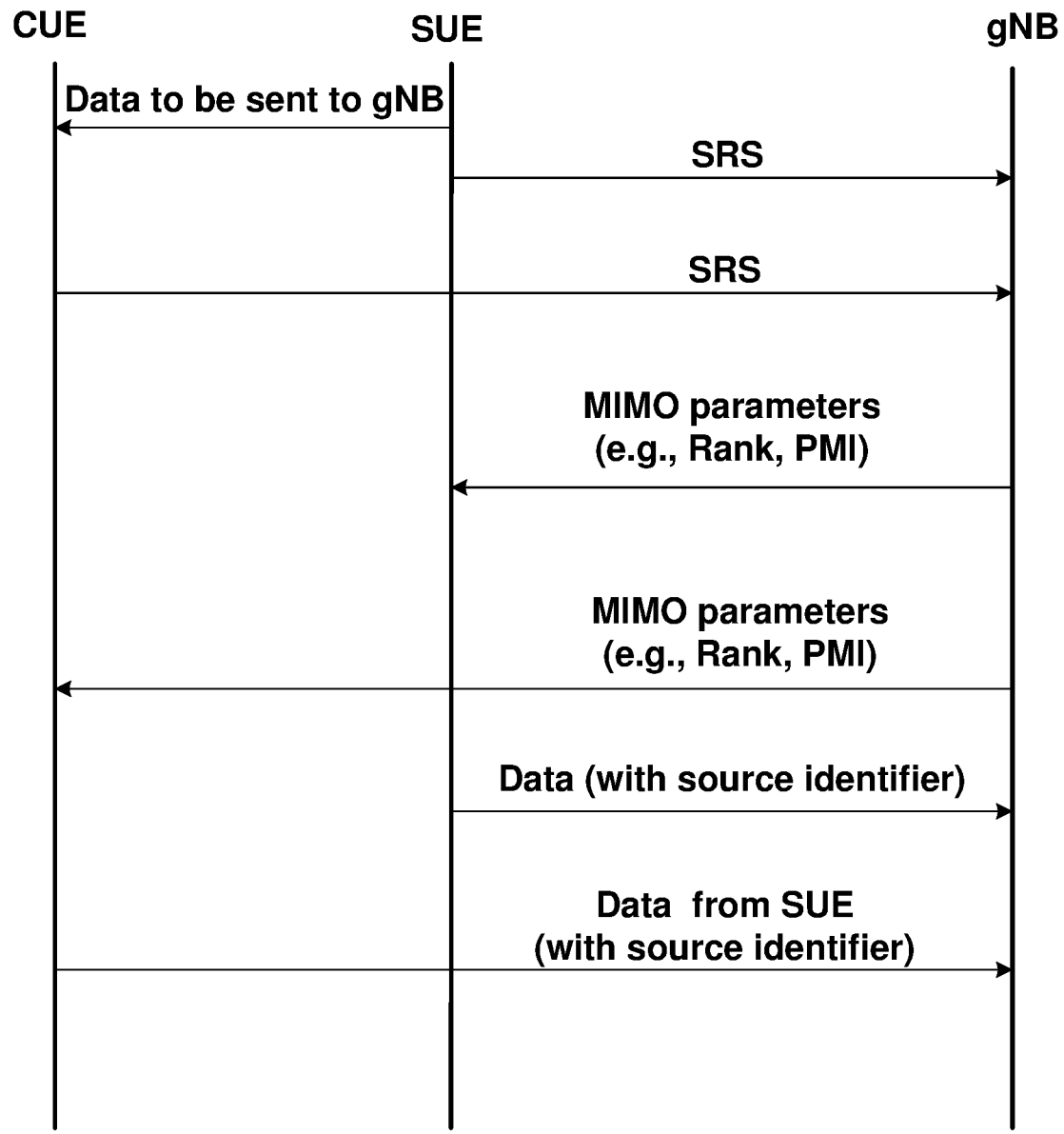
FIG. 4 is a signal flow diagram illustrating an example of closed loop UL cooperative transmission according to an embodiment.

FIG. 4 is a signal flow diagram illustrating an example of closed loop UL cooperative transmission according to an embodiment. The diagram in FIG. 4 includes the operations described above, for an example embodiment of cooperative MU-MIMO transmission. In the illustrated example, the SUE transmits to the CUE source data that is to be transmitted to network equipment, which is the gNB in FIG. 4. The SUE and the CUE each transmit a separate SRS to the gNB, which performs channel measurements and sends to the SUE and the CUE MIMO parameters that are based on the channel measurements. The SUE and CUE transmit SUE source data to the gNB, with a source identifier in the example shown.

In other embodiments there are multiple CUEs, and the SUE or a CUE transmits the SUE source data to each CUE. An SUE need not itself actually participate in cooperative transmission such as cooperative MIMO transmission, in which case the SUE need not transmit an SRS to the gNB or receive parameters from the gNB for the purposes of UL cooperative transmission. The UL transmission in such an embodiment is still cooperative in the sense that the CUEs cooperate with the SUE to assist the SUE with UL transmission, even though the SUE itself does not transmit its source data to the gNB.

In another approach, the participating UEs perform channel measurements, based on a configured DL Channel State Information Reference Signal (CSI-RS) for example. Based on the channel measurements, each participating UE obtains its UL precoder and layers, by determining or selecting the UL precoder for example. Those skilled in the art will be familiar with various options for obtaining a UL precoder based on such channel measurement results. In some embodiments, each participating UE applies its UL precoder to a set of configured SRSs. In the case of a multi-layer or multi-beam UE, each SRS is associated with one layer/beam in some embodiments.

In some embodiments, based on SRS measurements (or, independently or jointly with, the measurements of the demodulation pilots from the participating UEs) by network equipment, the network equipment determines whether the UL precoder for each participating UE should be modified, and if so, the network equipment signals a modified precoder (at least a subset of the UE selected precoder) to the participating UE. Each UE then performs UL transmission such as MIMO transmission according to its UL precoder, which is either the original UL precoder that was obtained by the UE based on its own channel measurements or the modified UL precoder received from the network equipment.

An identifier of the SUE may be included in each transmission of the source data, and in each retransmission if any, by each participating UE; or alternatively, an identifier of the SUE is transmitted through a control channel for transmission of the source data. Implicit signaling of an identifier is also possible. As noted above, this identifier enables the network equipment to identify the SUE as the source of the source data. All participating UEs transmit the source data of the SUE, and examples include all participating UEs transmitting the same portion or block of the SUE source data, each participating UE transmitting a respective different portion or block of the SUE source data, and each participating UE transmitting different RVs of the same portion or block of the SUE source data.

Figure 5:
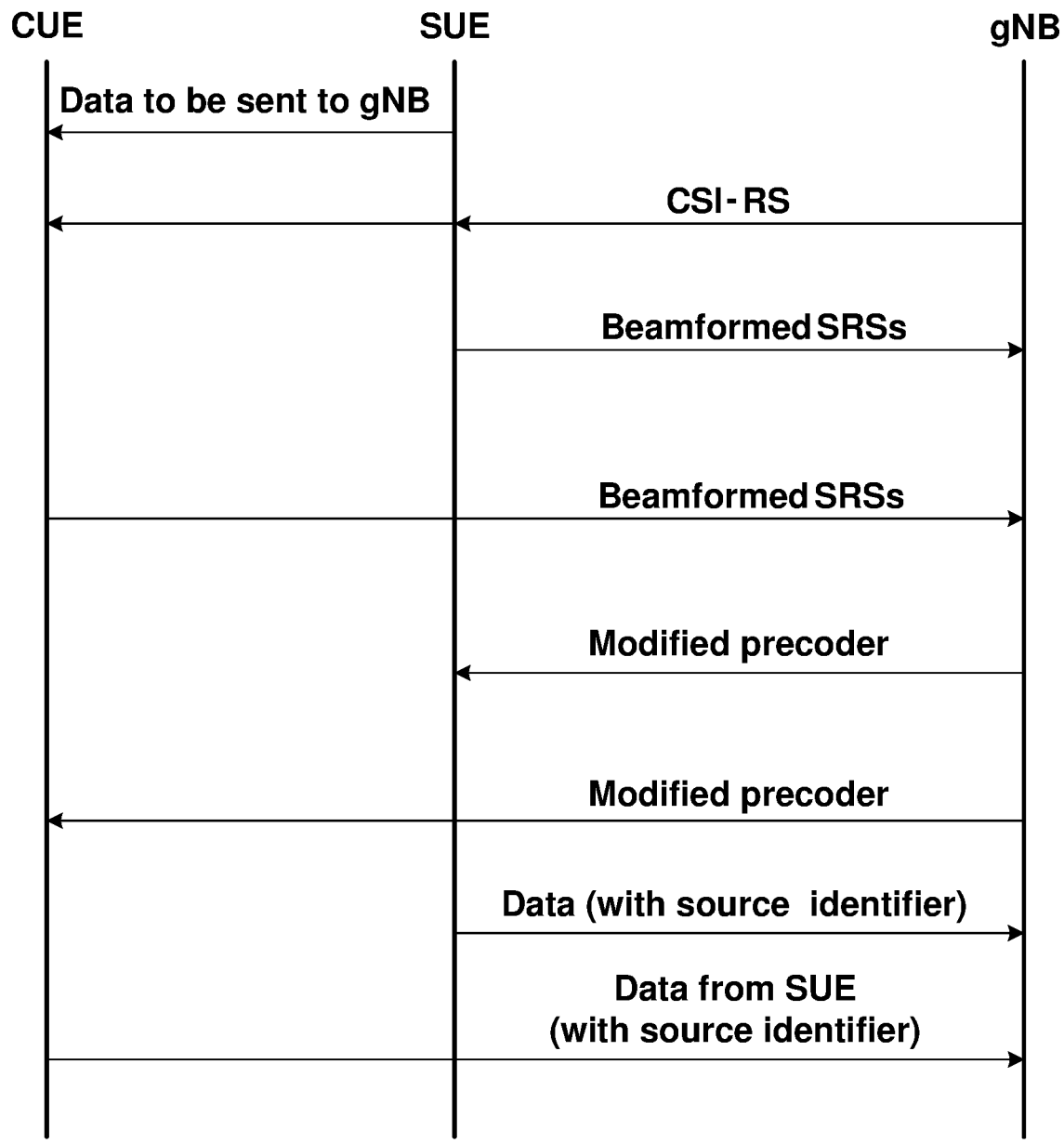
FIG. 5 is a signal flow diagram illustrating an example of closed loop UL cooperative transmission according to another embodiment.

FIG. 5 is a signal flow diagram illustrating an example of closed loop UL cooperative transmission according to another embodiment, and illustrates operations described above. In the example shown, the SUE transmits to the CUE source data that is to be transmitted to network equipment, which is the gNB in FIG. 5. The SUE and the CUE each perform channel measurements based on the CSI-RS transmitted by and received from the gNB, and obtain a UL precoder based on the channel measurements. In some embodiments, the SUE and CUE transmit separate beamformed SRSs based on the UL precoder to the gNB, which performs channel measurements and sends to the SUE and the CUE a respective modified precoder (if the gNB determines based on the channel measurements that either or both of the UL precoders should be modified). In the example shown, the SUE and CUE transmit SUE source data to the gNB with a source identifier.

As noted above with reference to FIG. 4, in other embodiments there are multiple CUEs, and the SUE or a CUE transmits the SUE source data to each CUE. An SUE need not itself actually participate in cooperative transmission, in which case the SUE need not transmit beamformed SRSs to the gNB or receive a modified precoder from the gNB for the purposes of UL cooperative transmission such as cooperative MU-MIMO.

In some embodiments, including closed loop UL cooperative MU-MIMO with or without channel reciprocity for example, a hybrid automatic repeat request (HARQ) process is independent at each participating UE. In other embodiments, according to a joint HARQ process, different RVs of the same HARQ process are transmitted by different participating UEs, to potentially improve reliability.

The participating UEs use independent Modulation Coding Sets (MCSs) in some embodiments. In other embodiments the participating UEs use a common MCS, to potentially reduce signaling overhead.

In some embodiments, orthogonal demodulation reference signal (DMRS) ports are configured across the participating UEs that are involved in UL cooperative transmission such as cooperative MU-MIMO.

Turning to a further example of closed loop cooperative joint precoding based UL MU-MIMO, as in closed loop cooperating UL virtual MIMO an SUE shares source data, which to be sent to network equipment, with one or more CUEs via one or more SLs. The CUE(s), and the SUE in some embodiments, perform MIMO operations to transmit the source data through UL cooperative MU-MIMO, but using joint precoding.

In some embodiments, the participating UEs that are participating in cooperative transmission such as cooperative MU-MIMO send SRSs. Network equipment performs channel measurements jointly, based on the SRSs that are received from the participating UEs. As noted herein for other approaches, the participating UEs include the SUE in some embodiments, and in other embodiments the participating UEs are CUEs and the SUE does not participate in UL cooperative transmission to the network equipment, other than transmitting the source data to one or more of the CUEs.

Based on the channel measurements, the network equipment determines one or more transmission parameters such as MIMO transmission parameters and signals the parameter(s) to the participating UEs. For joint precoding, the network equipment determines the transmission parameter(s) based on one precoding matrix that is used by all participating UEs. Each participating UE uses a different part or parts of the precoding matrix, but the same precoding matrix is used by all participating UEs.

Examples of MIMO transmission parameters include rank and PMI as noted above, and in joint precoding embodiments another example of a MIMO parameter is antenna port indicator such as an index, or an index to indicate the vectors (portion) of the joint precoder for a UE.

In some embodiments, a different antenna port indicator (or precoder index) is signaled to each participating UE along with PMI and rank indicator, to indicate to each participating UE the relative position of that UE's antenna port or the portion that can be used by the UE in a codebook matrix for joint precoding. A UE with multiple antennas (or antenna ports) receives multiple different antenna port indicators, including one for each of its antennas (or antenna ports), or the indicator for the starting antenna (or antenna port) plus number of antennas. In other embodiments, antenna port indicators are preconfigured, configured by Radio Resource Control (RRC) signaling, or dynamically configured by Downlink Control Information (DCI), and need not be signaled to the participating UEs by the network equipment with PMI.

Each participating UE performs precoding based on the PMI and the corresponding antenna port indicator(s). The UL cooperative MU-MIMO in this example is joint, in that all participating UEs are precoding its data according to the same precoding matrix indicated by the PMI but using different portion of the precoding matrix. For example, if there are three participating UEs with two antennas each, then each UE performs MIMO transmission based on a different pair of precoding vectors in the same precoding matrix for 6-input (overall 6 transmit antennas) MIMO. In embodiments that do not use joint precoding, each of the three UEs in this example performs MIMO transmission based on its own respective precoding matrix for 2-input (2 transmit antennas) MIMO.

As in other embodiments, an identifier of the SUE, such as an SUE ID, may be included in each transmission, and each retransmission if any, of the source data by each participating UE, or otherwise provided to a receiver such as network equipment, to enable the network equipment to identify the SUE as the source of the source data. The same portion or block of the SUE source data, different portions or blocks of the SUE source data, or different RVs of the same portion or block of the SUE source data could be transmitted by the participating UEs.

Figure 6:
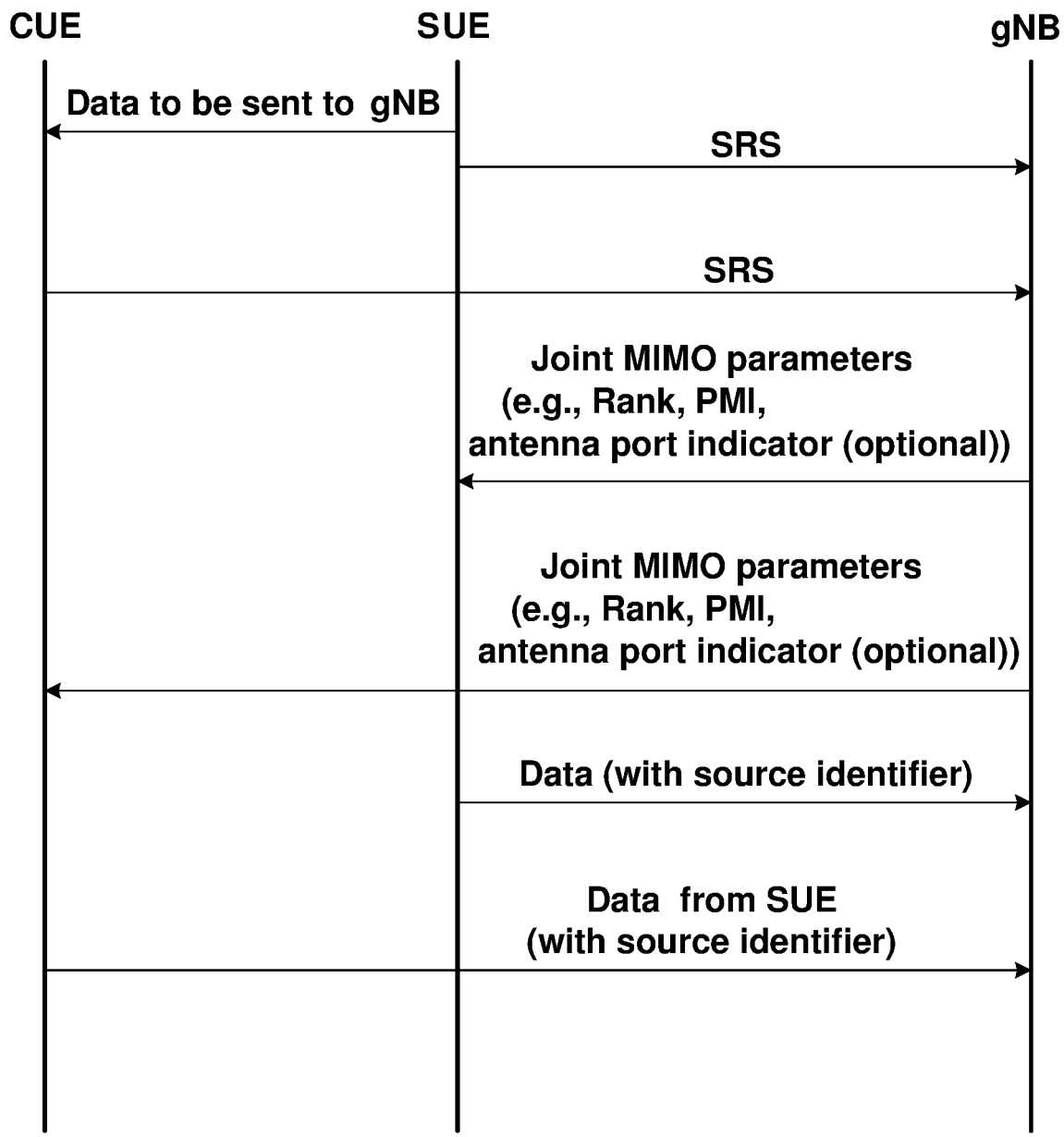
FIG. 6 is a signal flow diagram illustrating an example of closed loop cooperative joint precoding based UL transmission according to an embodiment.

FIG. 6 is a signal flow diagram illustrating an example of closed loop cooperative joint precoding based UL transmission according to an embodiment. The diagram in FIG. 6 includes the operations described above. In the illustrated example, the SUE transmits to the CUE source data that is to be transmitted to network equipment, which is the gNB in FIG. 6. The SUE and the CUE each transmit an SRS to the gNB, which performs joint channel measurements and sends to the SUE and the CUE joint parameters, such as MIMO parameters, that are based on the channel measurements. The SUE and CUE perform cooperative transmission such as cooperative MIMO transmission using joint precoding, to transmit SUE source data to the gNB, with a source identifier in the example shown.

In other embodiments there are multiple CUEs, and the SUE or a CUE transmits the SUE source data to each CUE. An SUE need not itself actually participate in cooperative transmission, in which case the SUE need not transmit an SRS to the gNB or receive parameters from the gNB for the purposes of UL cooperative transmission.

In another embodiment, each participating UE performs channel measurements based on a CSI-RS that is received from network equipment. For joint precoding, one of the participating UEs, for example a master UE or super UE or head UE which acts as a local head of the cooperative UE group that is configured for a UE cooperation group, obtains a joint UL precoder based on all participating UE channel measurements, by determining or selecting the joint UL precoder for example. From a cooperation group configuration, each UE would be aware of the master UE and could send the channel measurements to the master UE. Those skilled in the art will be familiar with various options for obtaining a UL precoder based on channel measurement results.

The UE that obtains the joint UL precoder sends the joint UL precoder to the network equipment in an embodiment.

In some embodiments, the UE that obtains the joint UL precoder shares the joint UL precoder with other participating UEs via SLs, including PMI, rank, and antenna port or precoder subset indicator (position of the joint precoding matrix), and each participating UE then sends the precoder information to the network equipment independently. For example, in an embodiment each participating UE applies its corresponding position(s) in the joint UL precoder to a set of configured SRSs. In the case of a multi-layer or multi-beam UE, each SRS is associated with one layer/beam in some embodiments.

Based on SRS measurements by network equipment, the network equipment determines whether the joint UL precoder should be modified, and if so, the network equipment signals at least modified parameters to each participating UE, or only to UEs corresponding to the precoding vectors in the joint UL precoding matrix that are affected by the modification.

Each participating UE performs precoding based on its antenna port indicator(s) and the joint UL precoding matrix, including any modifications by the network equipment. In some embodiments, a relative antenna port index for each antenna of each SUE/CUE involved in joint precoding is pre-configured and signalled to each participating UE. RRC or DCI could be used for signalling relative antenna port indices or other types of antenna port indicators, for example.

As in other embodiments, an identifier of the SUE, such as an SUE ID, may be included in each transmission, and each retransmission if any, of the source data by each participating UE, to enable the network equipment to identify the SUE as the source of the source data. Other options for providing an identifier to a receiver are also disclosed herein. The same portion or block of the SUE source data, different portions or blocks of the SUE source data, or different RVs of the same portion or block of the SUE source data could be transmitted by the participating UEs.

Figure 7:
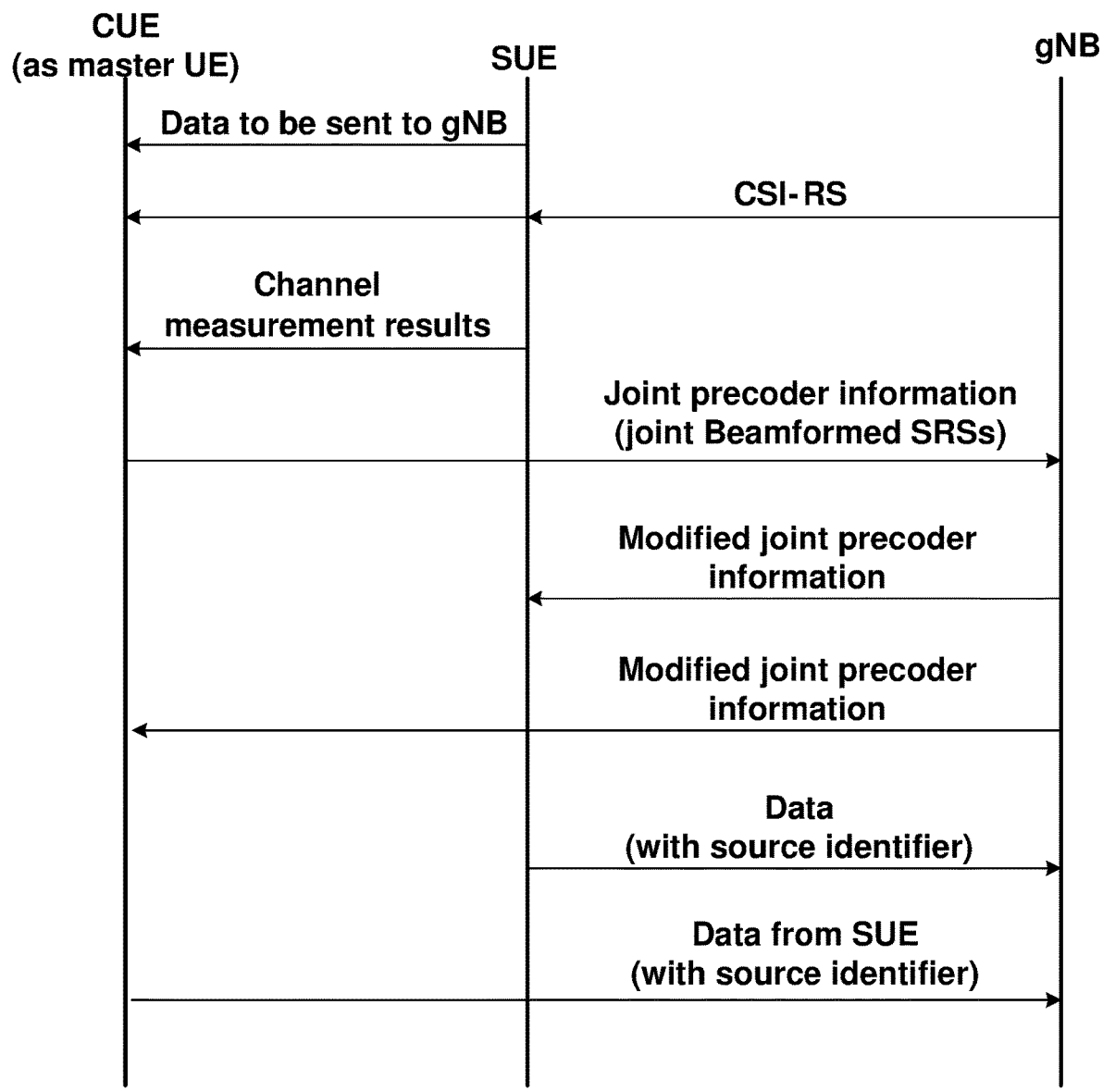
FIG. 7 is a signal flow diagram illustrating an example of closed loop cooperative joint precoding based UL transmission according to an embodiment.

FIG. 7 is a signal flow diagram illustrating an example of closed loop cooperative joint precoding based UL transmission according to an embodiment, and illustrates operations described above. In the example shown, the SUE transmits to the CUE source data that is to be transmitted to network equipment, which is the gNB in FIG. 7. The SUE and the CUE each perform channel measurements based on the CSI-RS transmitted by and received from the gNB, and the SUE transmits its channel measurements to the CUE, which is the master UE in the example shown. The CUE obtains a joint UL precoder based on the channel measurements, the CUE provides the joint UL precoder to the SUE, and both the SUE and the CUE transmit joint beamformed SRSs based on the joint UL precoder to the gNB.

The gNB performs channel measurements and sends to the SUE and the CUE a modified joint UL precoder information in this example (if the gNB determines based on the channel measurements that the joint UL precoder should be modified). The SUE and the CUE transmit SUE source data to the gNB, with a source identifier in the example shown.

In other embodiments there are multiple CUEs, the SUE or a CUE transmits the SUE source data to each CUE, and each CUE transmits its channel measurements to the master UE. Only the master UE, or all participating UEs, transmit joint beamformed SRSs to the gNB. An SUE need not itself actually participate in cooperative transmission such as cooperative MIMO transmission, in which case the SUE need not transmit channel measurement results to the master UE or receive modified joint UL precoder information from the gNB for the purposes of UL cooperative transmission such as cooperative MU-MIMO transmission.

In some embodiments, cooperative transmission such as closed loop cooperative joint precoding based UL MU-MIMO implements HARQ, and a single joint HARQ process may involve retransmission by all participating UEs in the event of an error.

In some embodiments, the participating UEs in cooperative transmission such as closed loop cooperative joint precoding based UL MU-MIMO use a common MCS, to potentially reduce signaling overhead.

In some embodiments, orthogonal DMRS ports are configured across the participating UEs that are involved in cooperative transmission such as closed loop cooperative joint precoding based UL MU-MIMO.

The embodiments described above with reference to FIGS. 4 to 7 are closed loop embodiments. Open loop cooperative transmission embodiments such as cooperative UL MU-MIMO embodiments are also possible.

For example, different precoding, such as pre-configured or otherwise specified precoding (e.g., cyclic delay diversity (CDD) precoding) could be applied by different participating UEs. An identifier of the SUE, such as an SUE ID, may be included in each transmission, and each retransmission if any, of the source data by each participating UE, to enable network equipment to identify the SUE as the source of the source data. There are also other ways to provide an identifier of an SUE to a receiver. All participating UEs, whether the SUE or a CUE, transmit the source data of the SUE. The same portion or block of the SUE source data, different portions or blocks of the SUE source data, or different redundancy versions (RVs) of the same portion or block of the SUE source data could be transmitted by the participating UEs.

Figure 8:
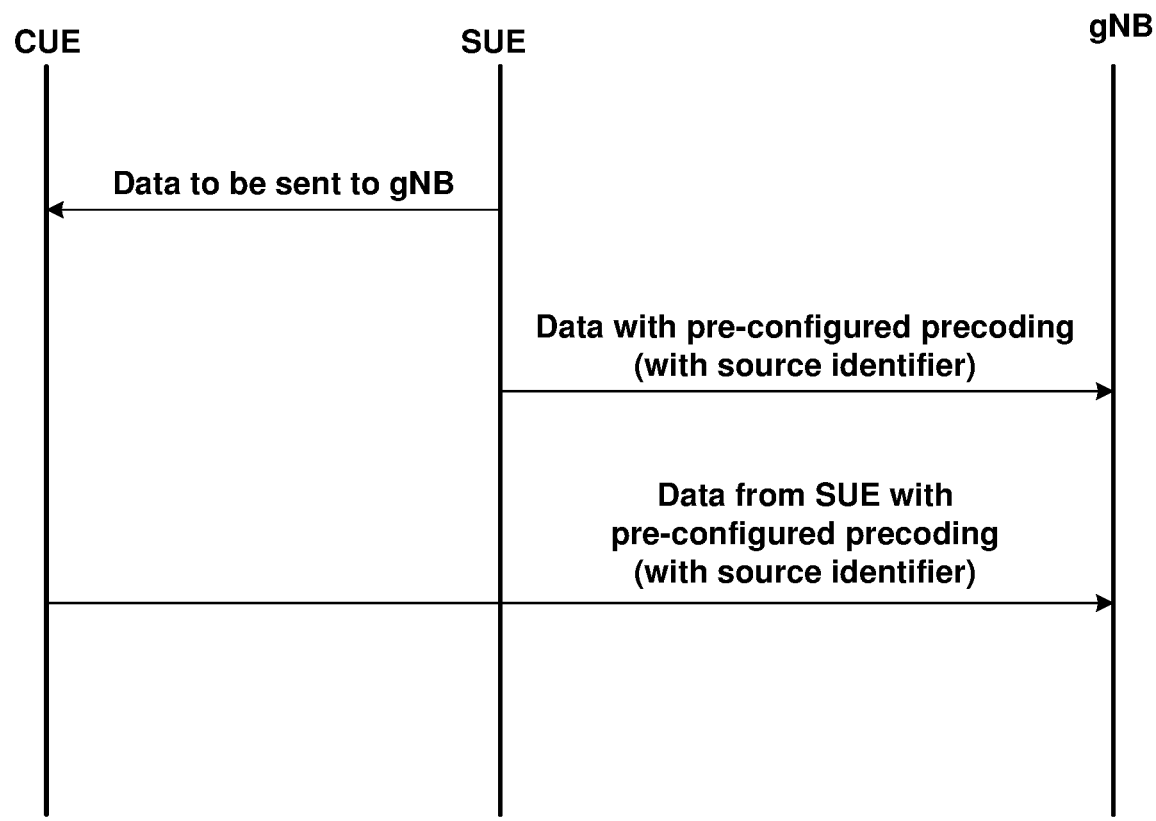
FIG. 8 is a signal flow diagram illustrating an example of open loop UL cooperative transmission according to an embodiment.

FIG. 8 is a signal flow diagram illustrating an example of open loop UL cooperative transmission without DL and UL channel reciprocity according to an embodiment. The diagram in FIG. 8 includes open loop operations described above. In the illustrated example, the SUE transmits to the CUE source data that is to be transmitted to network equipment, which is the gNB in FIG. 8. The SUE and CUE apply pre-configured precoding to transmit SUE source data to the gNB, with a source identifier in the example shown.

In other embodiments there are multiple CUEs, and the SUE or a CUE transmits the SUE source data to each CUE. An SUE need not itself actually participate in cooperative transmission.

In some embodiments, precoding could be based on channel measurements by the participating UEs. If there is DL/UL channel reciprocity for example (e.g., in a TDD system), then the participating UEs could measure the DL channel, based on a configured DL CSI-RS for example, and use the channel measurements to generate UL precoding vectors. In some embodiments, the participating UEs also or instead derive UL precoding vectors from DL beam directions and/or Quasi Co-Location (QCL) information.

Some embodiments involve virtual UE MIMO (with precoding performed separately for each participating UE). Embodiments that also or instead support joint precoding MIMO (with precoding performed jointly across the participating UEs) are also possible.

An identifier of the SUE, such as an SUE ID, may be included in each transmission, and each retransmission if any, of the source data by each participating UE, to enable network equipment to identify the SUE as the source of the source data. Other ways to provide an SUE identifier to a receiver are also possible. All participating UEs, whether the SUE or a CUE, transmit the source data of the SUE. The same portion or block of the SUE source data (to improve reliability for example), different portions or blocks of the SUE source data (to improve throughput for example), or different redundancy versions (RVs) of the same portion or block of the SUE source data could be transmitted by the participating UEs.

Figure 9:
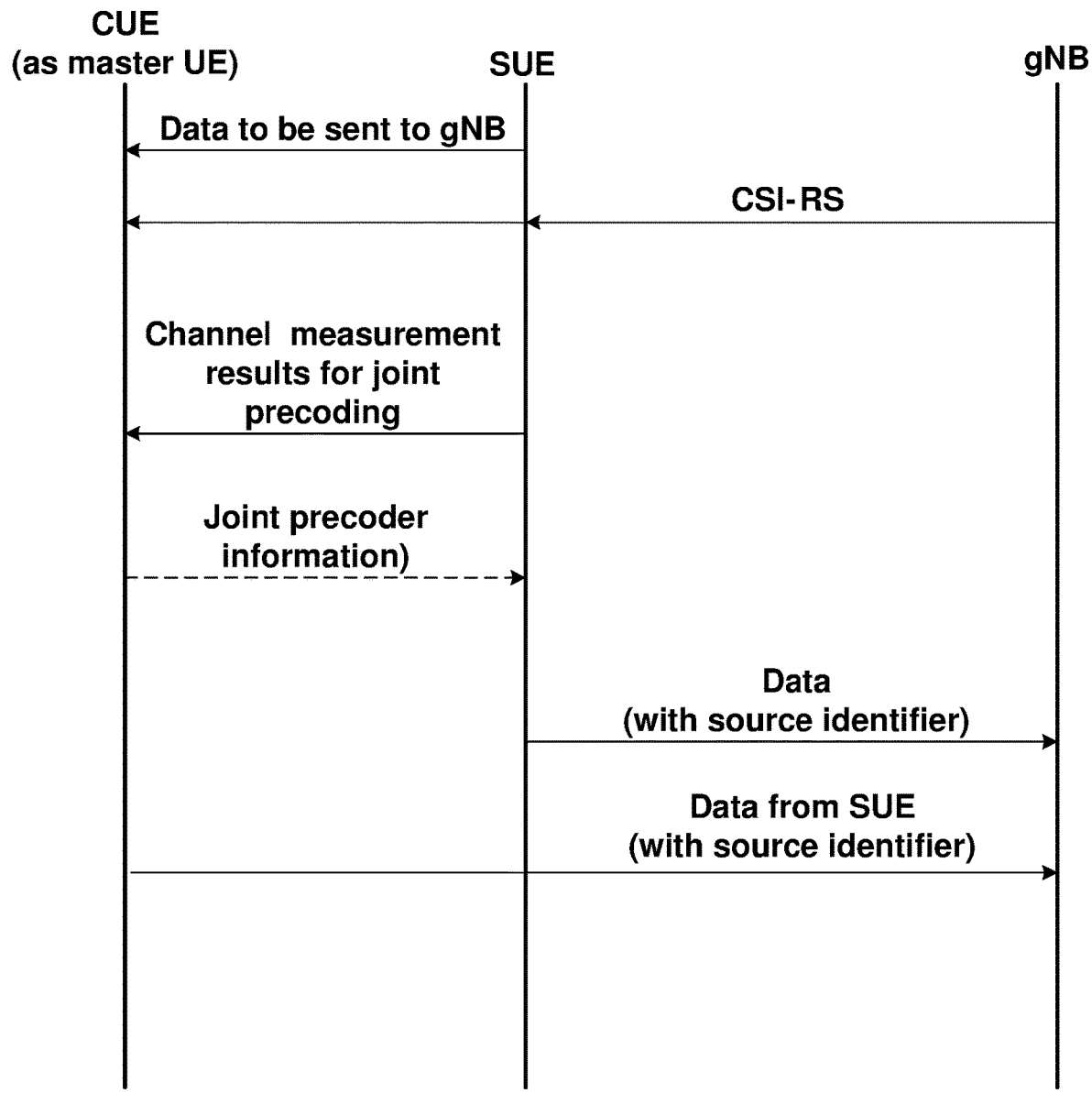
FIG. 9 is a signal flow diagram illustrating an example of open loop UL cooperative transmission with DL and UL channel reciprocity according to an embodiment.

FIG. 9 is a signal flow diagram illustrating an example of open loop UL cooperative transmission with DL and UL channel reciprocity according to an embodiment, and illustrates operations described above regarding open loop with DL and UL channel reciprocity. In the example shown, the SUE transmits to the CUE source data that is to be transmitted to network equipment, which is the gNB in FIG. 9. The SUE and the CUE each perform channel measurements based on the CSI-RS transmitted by and received from the gNB, and the SUE transmits its channel measurements to the CUE, which is the master UE in the example shown. The CUE obtains a joint UL precoder based on the channel measurements, and transmits an indication of the joint UL precoder to each other participating UE, which includes the SUE in the example shown. Other information, such as rank and/or one or more antenna port indications, could also be transmitted to each participating UE by the master UE. The SUE and the CUE transmit SUE source data to the gNB based on precoding using the joint UL precoder, with a source identifier in the example shown.

In other embodiments there are multiple CUEs, the SUE or a CUE transmits the SUE source data to each CUE. Each participating UE transmits its channel measurements to the master UE, and the master UE transmits an indication of the joint UL precoder to each participating UE. An SUE need not itself actually participate in cooperative transmission, in which case the SUE need not transmit channel measurement results to the master UE or receive joint UL precoder information from the master UE.

HARQ could be implemented with open loop cooperative UL transmission such as cooperative UL MU-MIMO transmission, including virtual UE MIMO and joint precoding-based MIMO. In some embodiments, different RVs of the same HARQ process could be transmitted by different participating UEs, to improve reliability for example. In some embodiments of joint precoding, for example, a single joint HARQ process is implemented. In other embodiments, different HARQ processes are used by different participating UEs.

Participating UEs in open loop cooperative UL transmission such as cooperative UL MIMO use different MCSs in some embodiments. A common MCS is used in other embodiments, such as in joint precoding embodiments to potentially reduce signaling overhead for example.

In some embodiments, orthogonal DMRS ports are configured across the participating UEs that are involved in closed loop cooperative joint precoding based UL transmission such as MU-MIMO transmission.

Hybrid UL cooperative transmission such as cooperative MU-MIMO transmission, in which different UL cooperative transmission approaches are applied together, is also possible. For example, in some embodiments a first transmission is based on joint precoding and a retransmission is based on cooperative virtual MIMO (or cooperative UL MU-MIMO). In another example, a first retransmission and a second retransmission apply different cooperative approaches such as different cooperative MIMO approaches. In some embodiments the numbers of UEs that participate in first transmission and/or retransmissions are different.

Various embodiments are discussed in detail above. Example methods that are performed by UEs and network equipment are also considered more generally below.

Figure 10:
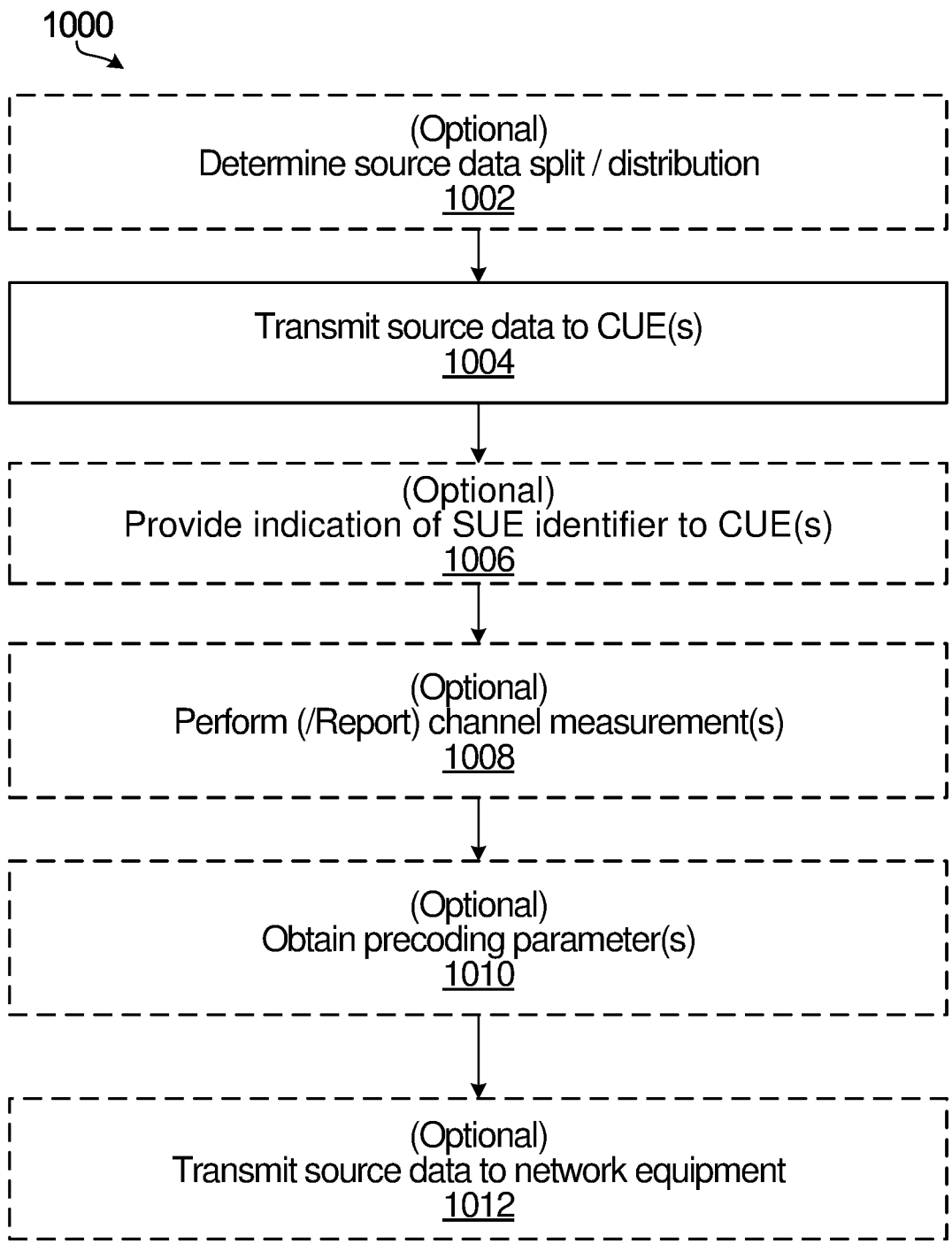
FIG. 10 is a flow diagram illustrating a method that is performed by an SUE according to an embodiment.

FIG. 10 is a flow diagram illustrating a method that is performed by an SUE according to an embodiment. The example method 1000 involves, in some embodiments, determining at 1002 how data that is to be transmitted, also referred to herein as source data, is to be split or distributed among multiple UEs for transmission via cooperative transmission in an uplink direction to network equipment in a communication network. In some embodiments, the SUE determines, from UE cooperation group configuration information that is stored at the SUE for example, the number of UEs in the cooperation group and determines a split or distribution of the source data equally among itself and the other UE(s) in the cooperation group. For example, the same source data may be transmitted to multiple CUEs, or different source data may be transmitted to multiple CUEs, for cooperative transmission by the multiple CUEs.

The SUE need not necessarily participate in cooperative UL transmission to be part of the cooperation group. For example, in some embodiments the SUE is able to communicate with one or more, but not all, of the CUEs within a cooperation group, and the CUEs assist the SUE with UL cooperative transmission even though the SUE does not actually participate in the cooperative transmission. Therefore, in some embodiments the multiple UEs that are involved in cooperative UL transmission include at least one CUE, and possibly but not necessarily the SUE.

In another embodiment, a source data split or distribution is determined based on a total number of antennas across UEs in the cooperation group, such as one block of the source data per antenna.

The data split or distribution also or instead depends on whether, and/or how much, data is to be transmitted by the CUEs in some embodiments.

Other source data split/distribution options are also possible. In general, UEs participating in cooperative transmission may transmit the same or different source data.

Operation 1002 is shown as being optional in FIG. 10, because in some embodiments a data split or distribution is preconfigured, for example with UE cooperation group configuration.

At 1004, the SUE transmits source data to one or more CUEs, over one or more SLs. The source data is associated with an identifier for identifying the SUE to the network equipment as a source of the data transmitted by the CUE(s) to the network equipment. An SUE ID is an example of such an identifier. All of the source data that is to be transmitted to the network equipment, or only a portion of the source data, is transmitted to the CUE(s) at 1004. In some embodiments, all of the source data is transmitted to CUEs if the SUE is not participating in the cooperative transmission, or if the SUE and CUE(s) are to transmit the same source data to improve reliability.

The operation at 1004 represents core features of some embodiments, to enable UL cooperative transmission such as cooperative MU-MIMO transmission, in which source data from one SUE is transmitted by multiple UEs and each of the UEs participating in the cooperative transmission also transmits the data to network equipment. The data may be transmitted with an identifier of the SUE or an indication of such an identifier in some embodiments, or an identifier or indication may be provided to the CUE(s) in some other way. Other features, such as any one or more of those described elsewhere herein and/or shown at 1002, 1006, 1008, 1010, 1012 are provided in other embodiments.

In some embodiments, a method also includes, at 1006, providing to the CUE(s) over the SL(s), an indication of the identifier. Examples of such an indication include an implicit identifier and an explicit identifier.

For example, the indication provided to the CUE(s) at 1006 is an explicit indication such as an SUE ID in some embodiments, and a method includes transmitting the indication of the identifier by the SUE to the CUE(s) over the SL(s). Transmission of an explicit indication is included in the transmission of source data to each CUE in some embodiments, or is a separate transmission in other embodiments. An indication of an identifier may be transmitted and carried in Sidelink Control Information (SCI) or a Medium Access Control—Control Element (MAC-CE), for example.

Regarding an implicit indication of the identifier, one way to indicate an SUE identifier is to introduce a member ID within a cooperative group so that network equipment is able to identify the SUE by member ID or group ID+member ID. In some embodiments, network equipment identifies the SUE based on a UE ID (for example C-RNTI or MAC ID) implicitly carried by an uplink data channel. Another example of an implicit indication of SUE identifier is a UE-specific scrambling sequence that is used by the SUE in transmitting the source data to the CUE(s). Each CUE then determines the SUE identity based on the scrambling sequence. In some embodiments, the UE-specific scrambling sequence can be generated from C-RNTI or MAC ID. These scrambling embodiments are illustrative of operations that involve scrambling the identifier with the data or scrambling the data with a sequence associated with the identifier.

In some embodiments, the SUE transmits at least a portion of the source data to the network equipment, at 1012. The SUE and CUE(s) transmit the same portion of the source data in some embodiments, and in other embodiments the data that is transmitted by the SUE at 1012 is different from the data that is to be transmitted by the CUE(s). In general, an SUE may or may not participate in cooperative transmission and transmit source data to a receiver such as network equipment, and each CUE transmits source data that it receives from the SUE. Considering an example of a first UE that is an SUE and second and third UEs that are CUEs that receive source data from the first UE, a method may or may not involve the first UE transmitting data to network equipment. In an embodiment such a method involves transmitting, by the second UE to the network equipment, the data from the first UE that is transmitted to the second UE and that is to be transmitted via the cooperative transmission; and transmitting, by the third UE to the network equipment, the data from the first UE that is transmitted to the third UE and that is to be transmitted via the cooperative transmission.

If the SUE is involved in transmission of the source data to the network equipment, then in some embodiments a method involves the SUE obtaining one or more precoding parameters such as joint precoding parameters, for the cooperative transmission. This is shown at 1010. In an embodiment, the precoding parameter(s) are pre-configured and stored at the SUE, and obtaining the precoding parameter(s) at 1010 involves accessing the precoding parameter(s) in UE memory.

In other embodiments, the obtaining at 1010 involves receiving one or more precoding parameters determined by the network equipment. As disclosed elsewhere herein, in some embodiments the SUE transmits an SRS to the network equipment, the network equipment performs channel measurements and determines one or more precoding parameters based on the channel measurements, and transmits the precoding parameter(s) to the SUE. In some embodiments, the precoding parameter(s) received from network equipment include one or more precoding parameters that are determined by the network equipment, and in other embodiments the precoding parameter(s) include one or more precoding parameters initially determined by a UE and modified by the network equipment.

The participating UEs, possibly including the SUE, perform channel measurements in some embodiments, and this is shown at 1008. One or more precoding parameters are determined by each participating UE, in virtual MIMO embodiments for example. In some embodiments, UE channel measurements are reported to a CUE such as the master UE in a cooperation group, and obtaining the precoding parameter(s) involves receiving the precoding parameter(s) from that CUE.

FIG. 10 is illustrative of an embodiment and includes several optional features. Other embodiments include additional, fewer, and/or different operations, performed in a similar order or a different order than shown. Variations may be or become apparent from features disclosed elsewhere herein, for example.

For instance, FIG. 10 relates to a method performed by an SUE and illustrates transmission of source data from the SUE to one or more CUEs over one or more SLs at 1004. In some embodiments, there is further distribution of source data by a CUE. For example, if an SUE is able to communicate with some, but not all, CUEs in a cooperation group, then in some embodiments source data is transmitted to the CUE(s) with which the SUE is able to communicate, and the source data is transmitted to one or more other CUEs in a cooperation group by the CUE(s) that receive the source data from the SUE. It is also possible that a CUE belongs to multiple cooperation groups, and in some embodiments such a CUE transmits source data to one or more CUEs in one or more other cooperation groups to further extend cooperative transmission such as cooperative MU-MIMO transmission.

Thus, in some embodiments a CUE forwards source data to other CUE(s) such as a third UE in the same cooperation group and/or in one or more different cooperation groups. An SUE forwards source data to one CUE or more than one CUE, and in the case of multiple CUEs the CUEs are part of the same cooperation group or multiple cooperation groups.

Any one or more of the following features are also or instead provided in some embodiments:
- the cooperative MIMO transmission supports or includes redundant transmissions in a HARQ process, examples of which are provided elsewhere herein;
- the redundant transmissions include transmissions according to different types of UE cooperation, also referred to and disclosed elsewhere herein as hybrid approaches;
- the cooperative transmission, such as cooperative MIMO transmission, involves closed loop cooperative transmission, such as closed loop cooperative MIMO transmission;
- the cooperative transmission, such as cooperative MIMO transmission, involves open loop cooperative transmission, such as open loop cooperative MIMO transmission.

Figure 11:
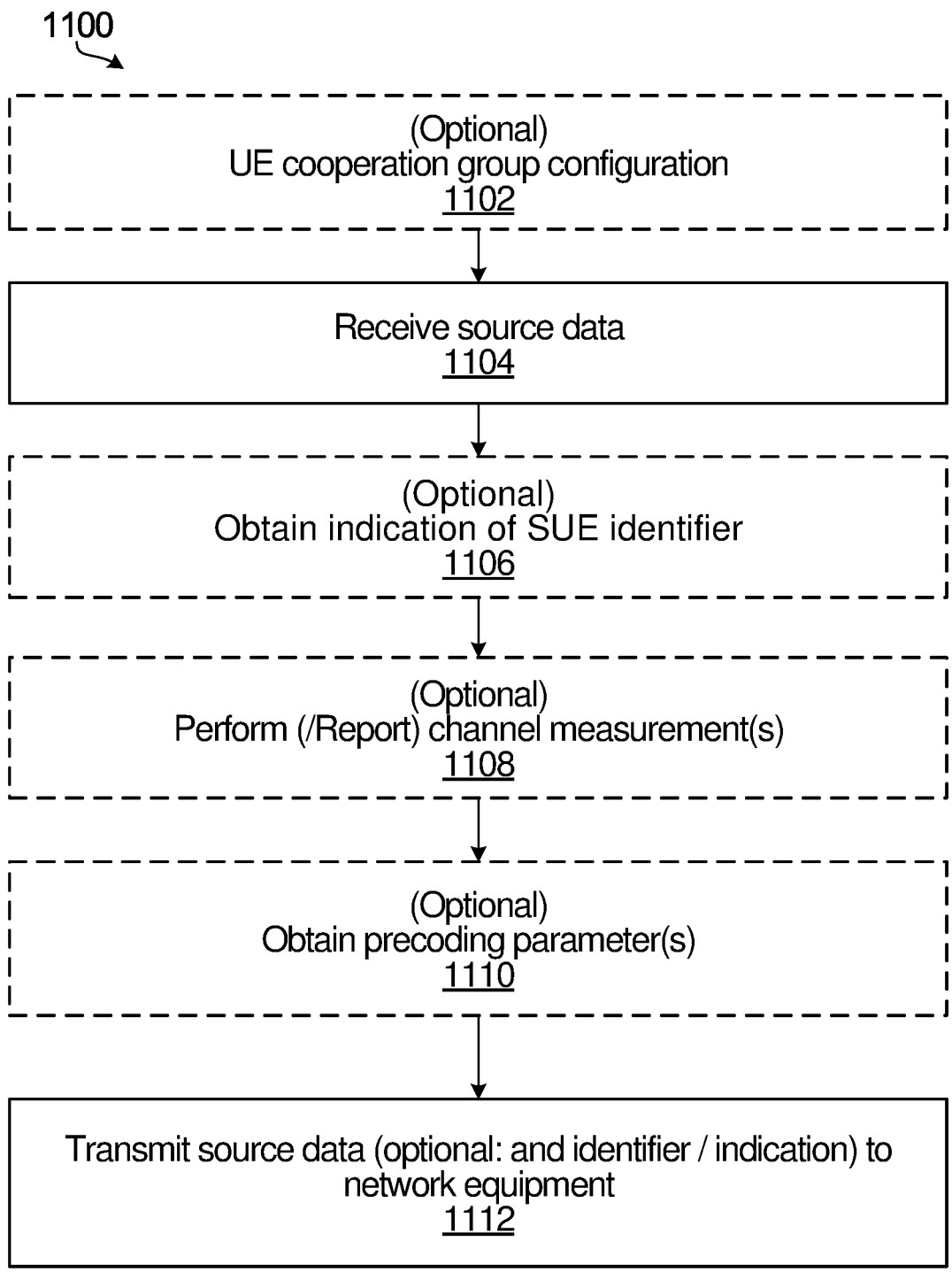
FIG. 11 is a flow diagram illustrating a method that is performed by a CUE according to an embodiment.

FIG. 11 is a flow diagram illustrating a method that is performed by a CUE according to an embodiment. The example method 1100 involves, in some embodiments, UE cooperation group configuration at 1102. This configuration need not be completed each time UL cooperative transmission such as cooperative MU-MIMO transmission is to be performed, and is instead completed in advance in some embodiments.

At 1104, the CUE receives, over an SL, data from an SUE that is to be transmitted via cooperative MIMO transmission by multiple UEs. This data is also referred to herein as source data. The multiple UEs include at least the CUE and possibly the SUE. The source data is received from the SUE in some embodiments, or from another CUE in other embodiments. In either case, the source data is data of the SUE and is to be transmitted in an uplink direction to network equipment in a communication network.

The operation at 1104 enables UL cooperative transmission such as cooperative MU-MIMO, in which source data from the SUE and possibly an identifier for identifying the second UE to the network equipment as a source of the source data are transmitted by multiple UEs including at least one CUE. This is shown at 1112. Examples of transmitting the identifier and the data include: transmitting an indication of the identifier, with the source data and/or separately; and scrambling the identifier with the data. More generally, each of the UEs participating in cooperative transmission such as cooperative MU-MIMO transmission may provide the network equipment with an explicit indication of the identifier of the SUE (by transmitting the identifier for example), or an implicit indication of the identifier of the SUE (by scrambling for example). Regardless of how a receiver such as network equipment is provided with an identifier or indication, the data that is transmitted via cooperative transmission is associated with an identifier for identifying the source UE as a source of the data.

FIG. 11 illustrates an embodiment in which the CUE is involved in cooperative transmission such as cooperative MU-MIMO transmission, and transmission of the source data (and an SUE identifier indication in some embodiments) to the network equipment is shown at 1112. In some embodiments, a CUE also or instead transmits source data (and possibly an SUE identifier or indication) to one or more other CUEs. Like the SUE, a CUE could distribute source data (and possibly an SUE identifier or an indication of an SUE identifier) to one or more CUEs, but need not itself otherwise participate in cooperative transmission such as cooperative MU-MIMO transmission. The same source data or different source data may be transmitted to multiple CUEs.

Other features, such as any one or more of those described elsewhere herein and/or shown at 1102, 1106, 1108, 1110, 1112 are provided in other embodiments.

In some embodiments, at 1106, the CUE obtains an identifier for identifying the SUE to the network equipment as a source of the source data in a transmission of the source data by the CUE to the network equipment. Examples of explicit and implicit indications of SUE identifiers are provided elsewhere herein. The obtaining at 1106 involves obtaining the identifier based on an explicit indication in some embodiments, such as by receiving the identifier or an indication of an identifier from the SUE over the SL. An identifier or indication may be received in SCI or a MAC-CE for example. In some embodiments, a method includes obtaining the identifier of the SUE based on an implicit indication provided to the CUE by the SUE or another CUE over the SL.

A CUE that transmits to the network equipment at 1112 obtains one or more precoding parameters in some embodiments, such as joint precoding parameters, for the cooperative transmission. This is shown at 1110. In an embodiment, the precoding parameter(s) are pre-configured and stored at the CUE, and obtaining the precoding parameter(s) at 1110 involves accessing the precoding parameter(s) in UE memory.

In other embodiments, the obtaining at 1110 involves receiving one or more precoding parameters determined by the network equipment. As disclosed elsewhere herein, in some embodiments the CUE transmits an SRS to the network equipment, the network equipment performs channel measurements and determines one or more precoding parameters based on the channel measurements, and transmits the precoding parameter(s) to the CUE. In some embodiments, the precoding parameter(s) received from network equipment include one or more precoding parameters that are determined by the network equipment, and in other embodiments the precoding parameter(s) include one or more precoding parameters initially determined by a UE and modified by the network equipment.

Participating UEs perform channel measurements in some embodiments, and this is shown at 1108. One or more precoding parameters, such as joint precoding parameters, are determined by each participating UE, in virtual MIMO embodiments for example. In some embodiments of cooperative transmission such as joint precoding UL MU-MIMO, UE channel measurements are reported to a CUE such as the master UE in a cooperation group, and obtaining the precoding parameter(s) involves receiving the precoding parameter(s) from that CUE. A method performed by a master CUE includes, in some embodiments, determining the one or more precoding parameters based on the UE channel measurements and transmitting the parameter(s) to each other participating UE.

FIG. 11 is illustrative of an embodiment and includes several optional features. Other embodiments include additional, fewer, and/or different operations, performed in a similar order or a different order than shown. Variations may be or become apparent from features disclosed elsewhere herein, for example.

For instance, FIG. 11 relates to a method performed by a CUE and illustrates transmission of source data and possibly an SUE identifier indication to network equipment at 1112. In some embodiments, a CUE receives and distributes the same or different source data to one or more other CUEs, such as a third UE, that are within the same UE cooperation group and/or in different UE cooperation groups.

Any one or more of the following features are also or instead provided in some embodiments:
- the cooperative transmission such as cooperative MIMO transmission supports or includes redundant transmissions in a HARQ process, examples of which are provided elsewhere herein;
- the redundant transmissions include transmissions according to different types of UE cooperation, also referred to and disclosed elsewhere herein as hybrid approaches;
- the cooperative transmission such as cooperative MIMO transmission involves closed loop cooperative transmission such as closed loop cooperative MIMO transmission;
- the cooperative transmission such as cooperative MIMO transmission involves open loop cooperative transmission such as open loop cooperative MIMO transmission;
- a method also involves transmitting, by the second UE, over a further sidelink to a third UE of the multiple UEs, data from the second UE that is to be transmitted via the cooperative transmission;
- a method also involves transmitting, by the third UE to the network equipment, the data that is transmitted by the second UE to the third UE and that is to be transmitted via the cooperative transmission;
- a method also involves transmitting, by the second UE to the network equipment, data that is different from the data that is transmitted to the network equipment by the first UE;
- a method also involves transmitting, by the second UE to the network equipment, the data.

Figure 12:
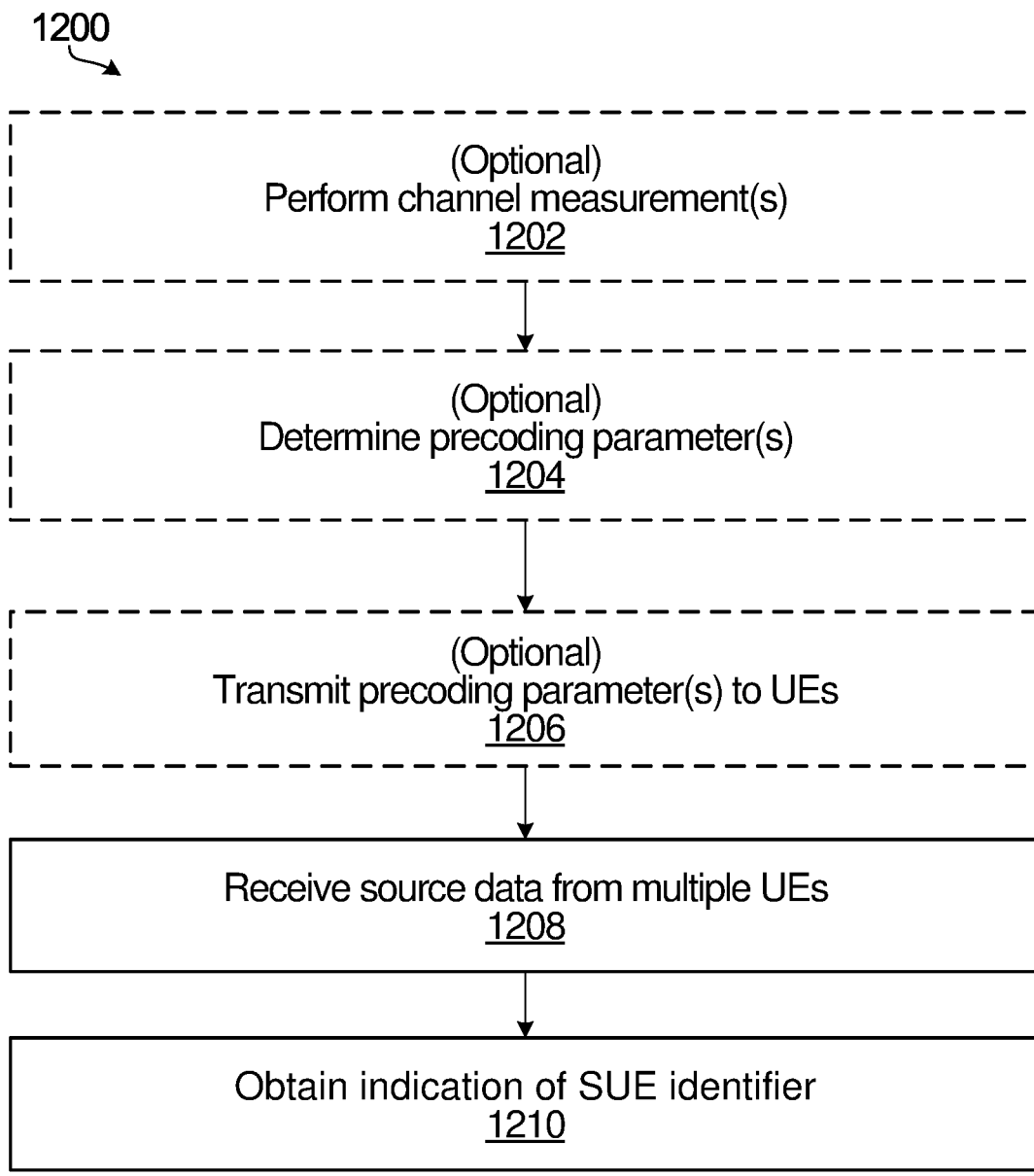
FIG. 12 is a flow diagram illustrating a method that is performed by network equipment according to an embodiment.

FIGS. 11 and 12 relate to methods performed by UEs. FIG. 12 is a flow diagram illustrating a method that is performed by network equipment according to an embodiment.

The example method 1200 involves, at 1208, receiving source data from multiple UEs. The source data is received as a cooperative transmission such as a cooperative MIMO transmission, by the multiple UEs, of source data from a single SUE. The multiple UEs include at least the CUE and possibly the SUE.

At 1210, the network equipment obtains an identifier for identifying the SUE to the network equipment as a source of the source data. Examples of explicit and implicit indications of SUE identifiers are provided elsewhere herein, and the obtaining at 1210 involves obtaining the identifier based on an explicit indication in some embodiments, or obtaining the identifier based on an implicit indication in other embodiments. Examples of indications that could be received by the network equipment and used to obtain the SUE identifier include a UE ID (for example C-RNTI) or another configured UE ID used for one or both of data scrambling and pilot scrambling.

The operations at 1208, 1210 enable UL cooperative transmission such as cooperative MU-MIMO transmission in which source data from one SUE is transmitted by multiple UEs to the network equipment. Each of the UEs participating in the cooperative transmission also provides network equipment with an implicit or explicit indication of an identifier of the SUE in some embodiments.

The participating UEs transmit the same or different portions of the source data. Therefore, in some embodiments, the cooperative transmission such as cooperative MIMO transmission received at 1208 includes components of respective different portions of the source data transmitted by each of the multiple UEs. In other embodiments, the cooperative transmission such as cooperative MIMO transmission received at 1208 includes components of a common portion of the source data transmitted by each of the multiple UEs.

Other features, such as any one or more of those described elsewhere herein and/or shown at 1202, 1204, 1206 are provided in other embodiments.

In closed loop embodiments, the network equipment performs channel measurements at 1202, based on received SRSs for example, and at 1204 determines one or more precoding parameters such as joint precoding parameters for the cooperative transmission such as cooperative MIMO transmission. The one or more precoding parameters determined by the network equipment are transmitted to the participating UEs at 1206.

In some embodiments, initial precoding parameter(s) determined by one or more of the UEs are received by the network equipment, and the network equipment determines and transmits to the UEs modified precoding parameter(s) based on the initial precoding parameter(s).

FIG. 12 is illustrative of an embodiment and includes several optional features. Other embodiments include additional, fewer, and/or different operations, performed in a similar order or a different order than shown. Variations may be or become apparent from features disclosed elsewhere herein, for example.

Embodiments are described above primarily in the context of example methods. Other embodiments are also possible.

Figure 13A:
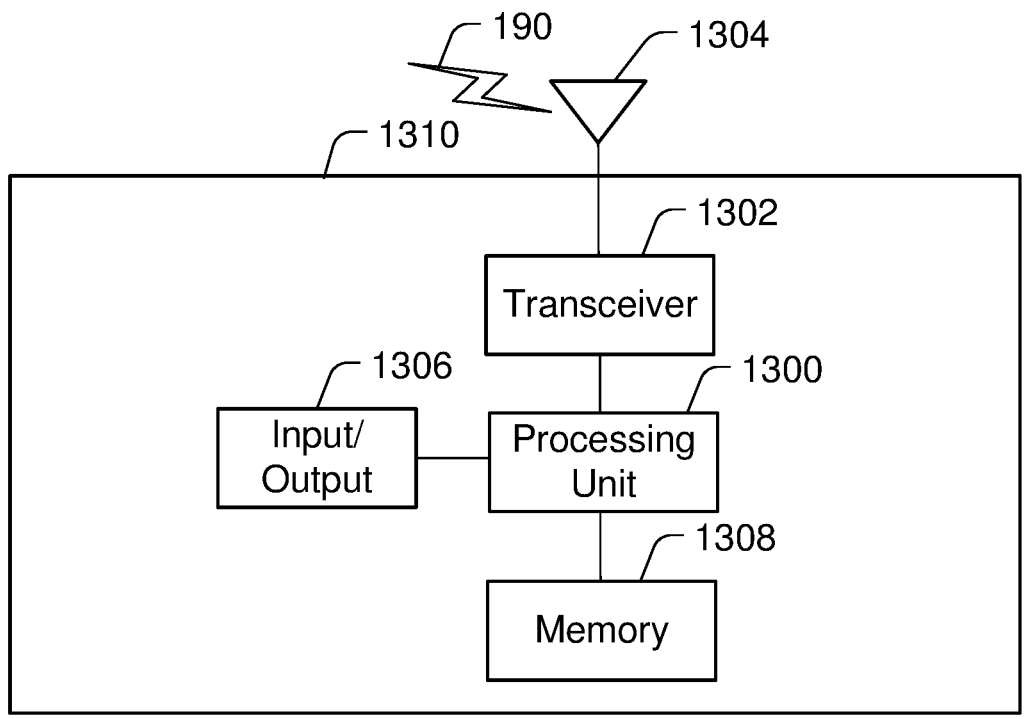
FIGS. 13A and 13B are block diagrams illustrating example devices that may implement the methods and teachings according to this disclosure.
Figure 13B:
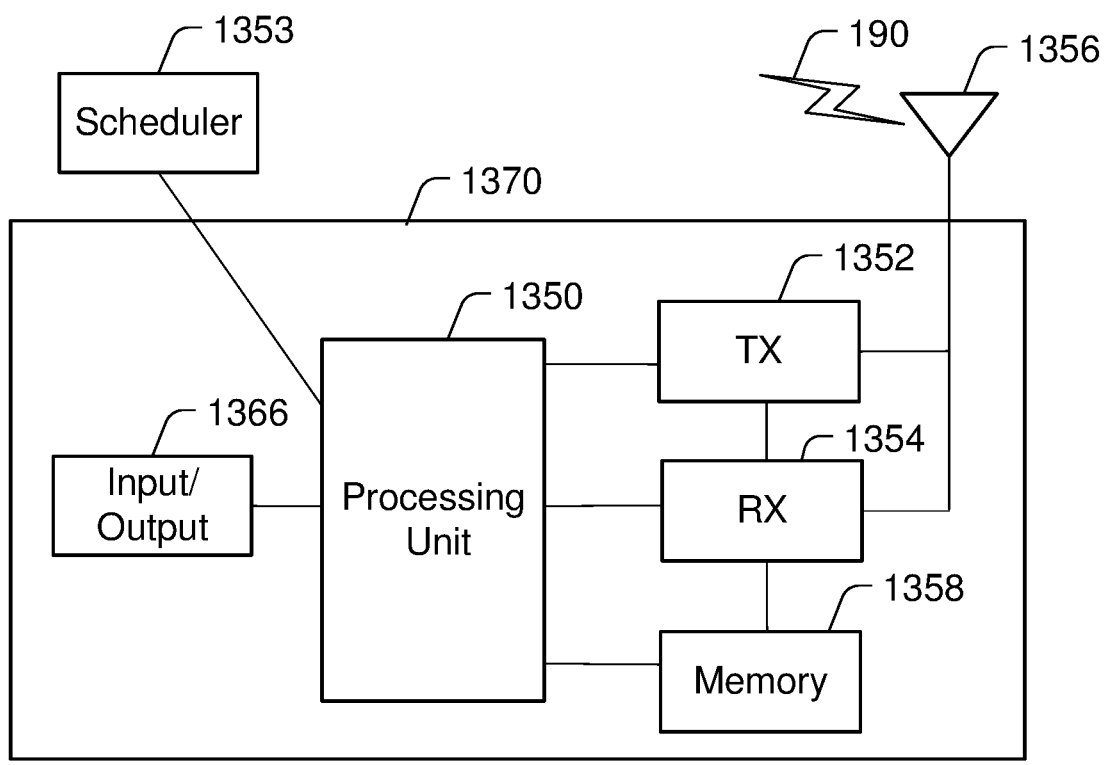

See, for example, FIGS. 13A and 13B which illustrate example devices that may implement the methods and teachings according to this disclosure.

FIG. 13A illustrates an example ED 1310, and FIG. 13B illustrates an example base station 1370. These components could be used in the system 100 (FIG. 1) or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in a communication system. The processing unit 1300 may also be configured to implement some or all of the functionality and/or embodiments described in more detail herein. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless transmission and/or processing signals received wirelessly or by wire. Each antenna 1304 includes any suitable structure for transmitting and/or receiving wireless signals. One or multiple transceivers 1302 could be used in the ED 1310, and one or multiple antennas 1304 could be used in the ED 1310. Although shown as a single functional unit, a transceiver 1302 could be implemented using at least one transmitter and at least one separate receiver.

The ED 1310 further includes one or more input/output devices 1306 or interfaces. The input/output devices 1306 facilitate interaction with a user or other devices (network communications) in the network. Each input/output device 1306 includes any suitable structure for providing information to or receiving/providing information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software instructions or modules configured to implement some or all of the functionality and/or embodiments described above and that are executed by the processing unit(s) 1300. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transmitter 1352, at least one receiver 1354, one or more antennas 1356, at least one memory 1358, and one or more input/output devices or interfaces 1366. A transceiver, not shown, may be used instead of the transmitter 1352 and receiver 1354. A scheduler 1353 may be coupled to the processing unit 1350. The scheduler 1353 may be included within or operated separately from the base station 1370. The processing unit 1350 implements various processing operations of the base station 1370, such as signal coding, data processing, power control, input/output processing, or any other functionality. The processing unit 1350 can also be configured to implement some or all of the functionality and/or embodiments described in more detail herein. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transmitter 1352 includes any suitable structure for generating signals for wireless transmission to one or more EDs or other devices. Each receiver 1354 includes any suitable structure for processing signals received wirelessly or by wire from one or more EDs or other devices. Although shown as separate components, at least one transmitter 1352 and at least one receiver 1354 could be combined into a transceiver. Each antenna 1356 includes any suitable structure for transmitting and/or receiving wireless signals. While a common antenna 1356 is shown here as being coupled to both the transmitter 1352 and the receiver 1354, one or more antennas 1356 could be coupled to the transmitter(s) 1352, and one or more separate antennas 1356 could be coupled to the receiver(s) 1354. Each memory 1358 includes any suitable volatile and/or non-volatile storage and retrieval device(s) such as those described above in connection to the ED 1310. The memory 1358 stores instructions and data used, generated, or collected by the base station 1370. For example, the memory 1358 could store software instructions or modules configured to implement some or all of the functionality and/or embodiments described herein and that are executed by the processing unit(s) 1350.

Each input/output device 1366 facilitates interaction with a user or other devices (network communications) in the network. Each input/output device 1366 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these and/or other modules. The respective units/modules may be implemented using hardware, components that execute software, or a combination thereof. For instance, one or more of the units/modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. The memory 1308 and/or the memory 1358, for example, could include one or more physical memory devices. Solid-state memory devices such as a Flash memory device, and/or memory devices with movable or even removable storage media, could be implemented.

FIG. 13A and FIG. 13B illustrate examples of a UE and network equipment, respectively, in which embodiments could be implemented. More generally, a UE could include a processor and a non-transitory computer readable storage medium, such as the processing unit 1300 and memory 1308 in FIG. 13A. In an embodiment, the storage medium stores programming for execution by the processor, and the programming includes instructions to perform an SUE method as disclosed herein.

Another embodiment relates to a computer program product that includes a non-transitory computer readable storage medium storing programming. The programming includes instructions to perform an SUE method as disclosed herein.

In some embodiments, the programming includes instructions to transmit, by a first UE to a second (cooperative) UE over an SL, data from the first UE that is to be transmitted via cooperative transmission such as cooperative MIMO transmission by multiple UEs including at least the cooperative UE, in an uplink direction to network equipment in a communication network. The data is associated with an identifier for identifying the first UE to the network equipment as a source of the data transmitted by the second UE to the network equipment.

Some embodiments include any one or more of the following features, in any of various combinations:
  the programming further includes instructions to provide,
    by the first UE to the second UE over the SL, an explicit indication of the identifier or an implicit indication of the identifier;

the programming further includes instructions to transmit, by the first UE to the second UE over the SL, an indication of the identifier;

the programming further includes instructions to transmit the indication of the identifier in SCI or a MAC-CE;

the programming further includes instructions to scramble the identifier with the data;

the programming further includes instructions to scramble the data with a sequence that is associated with the identifier;

the programming further includes instructions to transmit, by the first UE to the network equipment, data different from the data that is to be transmitted by the second UE;

the programming further includes instructions to transmit, by the first UE to the network equipment, the data;

the programming further includes instructions to obtain, by the first UE, joint precoding parameters for the cooperative transmission such as cooperative MIMO transmission by the UE and the cooperative UE;

the obtaining involves receiving, as the joint precoding parameters, joint precoding parameters determined by the network equipment;

the joint precoding parameters are or include joint precoding parameters determined by the first UE, the second UE, or another UE in a cooperation group to which the multiple UEs belong;

the joint precoding parameters are or include joint precoding parameters determined by the first UE, the second UE, or the other UE and modified by the network equipment;

the programming further includes instructions to transmit over a further sidelink, by the first UE to a third UE of the multiple UEs, the data from the UE that is to be transmitted via the cooperative transmission such as cooperative MIMO transmission;

the cooperative transmission such as cooperative MIMO transmission supports or includes redundant transmissions in a hybrid automatic repeat request (HARQ) process;

the redundant transmissions include transmissions according to different types of UE cooperation;

the cooperative transmission such as cooperative MIMO transmission involves closed loop cooperative transmission such as closed loop cooperative MIMO transmission;

the cooperative transmission such as cooperative MIMO transmission comprises open loop cooperative transmission such as open loop cooperative MIMO transmission.

In some embodiments, the programming relates to a CUE method, and includes instructions to receive, by the UE (a first UE) over a SL, data from a source UE (second UE) that is to be transmitted via cooperative transmission such as cooperative multiple-input multiple-output (MIMO) transmission by multiple UEs including at least the first UE, in an uplink direction to network equipment in a communication network; and to transmit, by the first UE to the network equipment, the data and possibly an identifier with which the data is associated. The identifier is for identifying the second UE to the network equipment as a source of the data.

Some embodiments include any one or more of the following features, in any of various combinations:

the programming further includes instructions to transmit an indication of the identifier;

the programming further includes instructions to transmit the data by scrambling the identifier with the data;

the programming further includes instructions to transmit the data by scrambling the data with a sequence that is associated with the identifier;

the programming further includes instructions to receive, by the first UE from the second UE, an explicit indication of the identifier;

the programming further includes instructions to receive the explicit indication of the identifier in SCI or a MAC-CE;

the programming further includes instructions to obtain the identifier based on an implicit indication provided to the first UE by the second UE over the SL;

the programming further includes instructions to obtain, by the first UE, joint precoding parameters for the cooperative transmission such as cooperative MIMO transmission;

the obtaining involves receiving, as the joint precoding parameters, joint precoding parameters determined by the network equipment;

the joint precoding parameters are or include joint precoding parameters determined by the first UE, the second UE, or another UE in a cooperation group to which the multiple UEs belong;

the joint precoding parameters are or include joint precoding parameters determined by the first UE, the second UE, or the other UE and modified by the network equipment;

the programming further includes instructions to transmit over a further sidelink, by the first UE to a third UE of the multiple UEs, the data from the first UE that is to be transmitted via the cooperative transmission such as cooperative MIMO transmission;

the cooperative transmission such as cooperative MIMO transmission supports or includes redundant transmissions in a HARQ process;

the redundant transmissions involve transmissions according to different types of UE cooperation;

the cooperative transmission such as cooperative MIMO transmission involves closed loop cooperative transmission such as closed loop cooperative MIMO transmission;

the cooperative transmission such as cooperative MIMO transmission involves open loop cooperative transmission such as open loop cooperative MIMO transmission.

Other features that could be implemented in UE embodiments could be or become apparent, for example, from the method embodiments disclosed herein.

A base station, which is illustrative of network equipment, could include a processor and a non-transitory computer readable storage medium, such as the processing unit 1350 and memory 1358 in FIG. 13B. In such an embodiment, the storage medium stores programming for execution by the processor, and the programming could include instructions to perform a network equipment method as disclosed herein. Another embodiment relates to a computer program product that includes a non-transitory computer readable storage medium storing programming, with the programming including instructions to perform a network equipment method as disclosed herein.

In a network equipment embodiment, the programming includes instructions to receive, from multiple UEs, a cooperative transmission such as a cooperative MIMO transmission, by the multiple UEs, of source data from a source UE; and obtain, by the network equipment, an identifier for identifying the source UE to the network equipment as a source of the source data.

Network equipment embodiments include embodiments with any one or more of the following features, in any of various combinations:
- the cooperative transmission such as cooperative MIMO transmission includes components of respective different portions of the source data transmitted by each of the multiple UEs;
- the cooperative transmission such as cooperative MIMO transmission includes components of a common portion of the source data transmitted by each of the multiple UEs;
- the programming further includes instructions to determine, by the network equipment, joint precoding parameters for the cooperative transmission such as cooperative MIMO transmission by the multiple UEs;
- the programming further includes instructions to transmit, by the network equipment to the multiple UEs, the joint precoding parameters;
- the programming further includes instructions to perform, by the network equipment, measurements based on further signals received from the multiple UEs;
- the determining involves determining the joint precoding parameters based on the measurements;
- the programming further includes instructions to receive, from one or more of the multiple UEs, initial joint precoding parameters based on measurements performed by each of the multiple UEs;
- the determining involves determining, as the joint precoding parameters, modified joint precoding parameters based on the initial joint precoding parameters.

Other features that could be implemented in network equipment embodiments could be or become apparent, for example, from the method embodiments disclosed herein.

Figure 14:
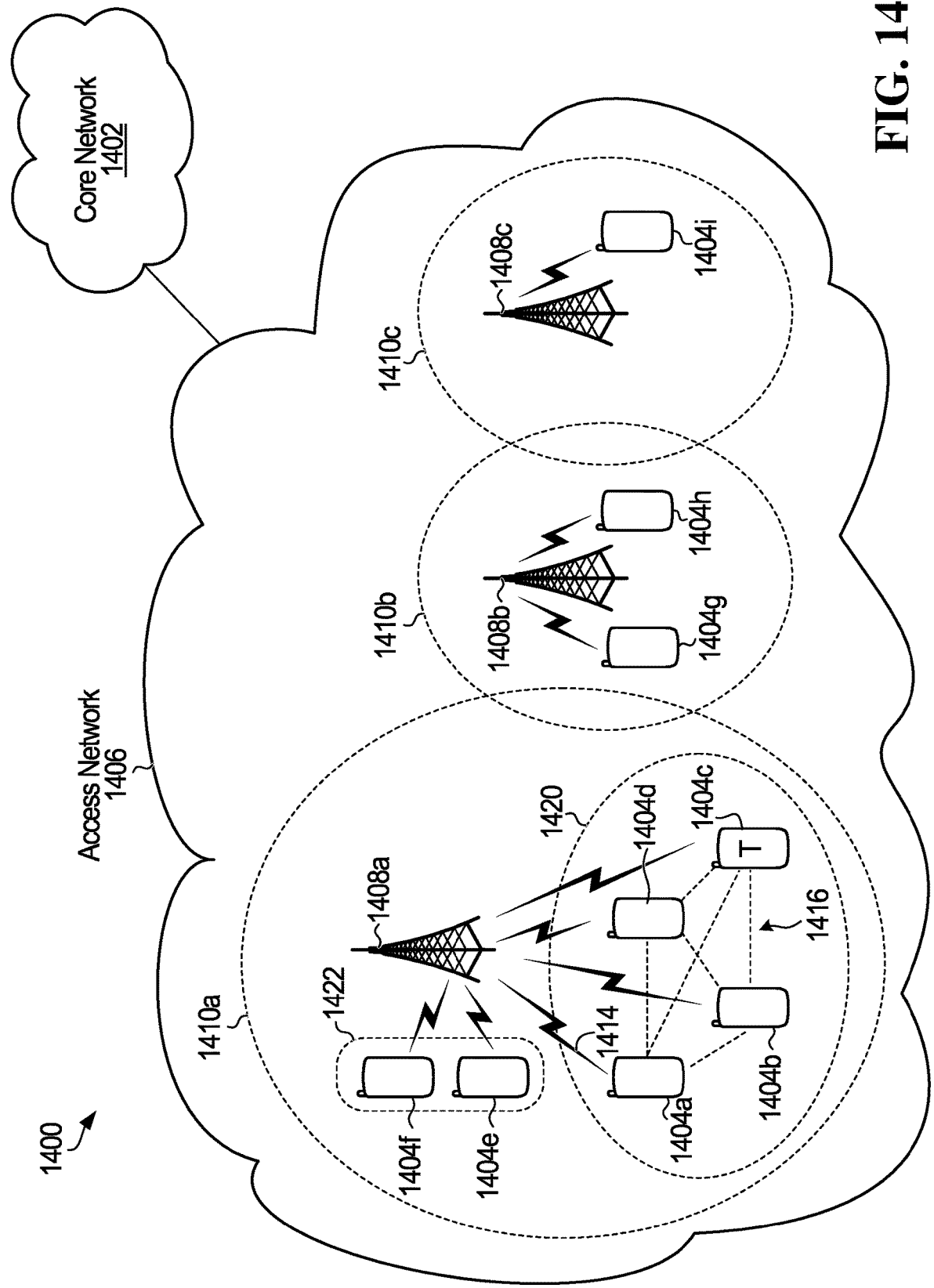
FIG. 14 is a block diagram illustrating an example of a telecommunications network according to one embodiment.

FIG. 14 is a block diagram illustrating an example of a telecommunications network 1400 according to one embodiment. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 is an Evolved Universal Terrestrial Access (E-UTRA) network in some embodiments. Another example of an access network 1406 is a cloud access network (C-RAN). The access network 1406 includes a plurality of BSs 1408a, 1408b, and 1408c. The BSs 1408a-c each provide a respective wireless coverage area 1410a, 1410b, and 1410c, also referred to as a cell. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs, such as SL communications as disclosed herein, that do not go through an access network component, such as a BS. As shown in FIG. 14, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a but UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. UL cooperative MU-MIMO as disclosed herein is another example of an application of UE cooperation.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group; that is, address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as a TUE or SUE. In the examples above referring to the UE 1404c, the UE 1404c is being assisted and so is the TUE 1404c. The other UEs 1404a, 1404b, and 1404*d* in the group 1420 form a cooperation candidate set, which is a set of UEs that may cooperate to help the TUE 1404*c*. The subset of UEs in the cooperation candidate set that actually assist the target UE 1404*c* form a cooperation active set or a cooperation group. The cooperation active set may be dynamically selected to assist the TUE 1404*c*. The UEs in the cooperation active set are referred to as CUEs.

In UE group 1420, UEs 1404*a*, 1404*b*, and 1404*d* form the cooperation candidate set. If UEs 1404*a* and 1404*b* actually assist target UE 1404*c*, then UEs 1404*a* and 1404*b* form the cooperation active set and are the CUEs. As UEs 1404*a-d* move around, some may leave the UE group 1420 and/or other UEs may join the UE group 1420. Therefore, the cooperation candidate set may change over time. For example, the cooperation candidate set may change semi-statically. The UE group 1420 may also be terminated by the network 1406, for example, if the network determines that there is no longer a need or opportunity for the UE group 1420 to provide assistance in wireless communication between the BS 908*a* and members of the UE group 1420.

There may be more than one UE group. For example, UEs 1404*e* and 1404*f* in FIG. 14 form another UE group 1422.

For UL cooperative transmission such as cooperative MU-MIMO as disclosed herein, an assisted UE is referred to primarily as an SUE.

Figure 15:
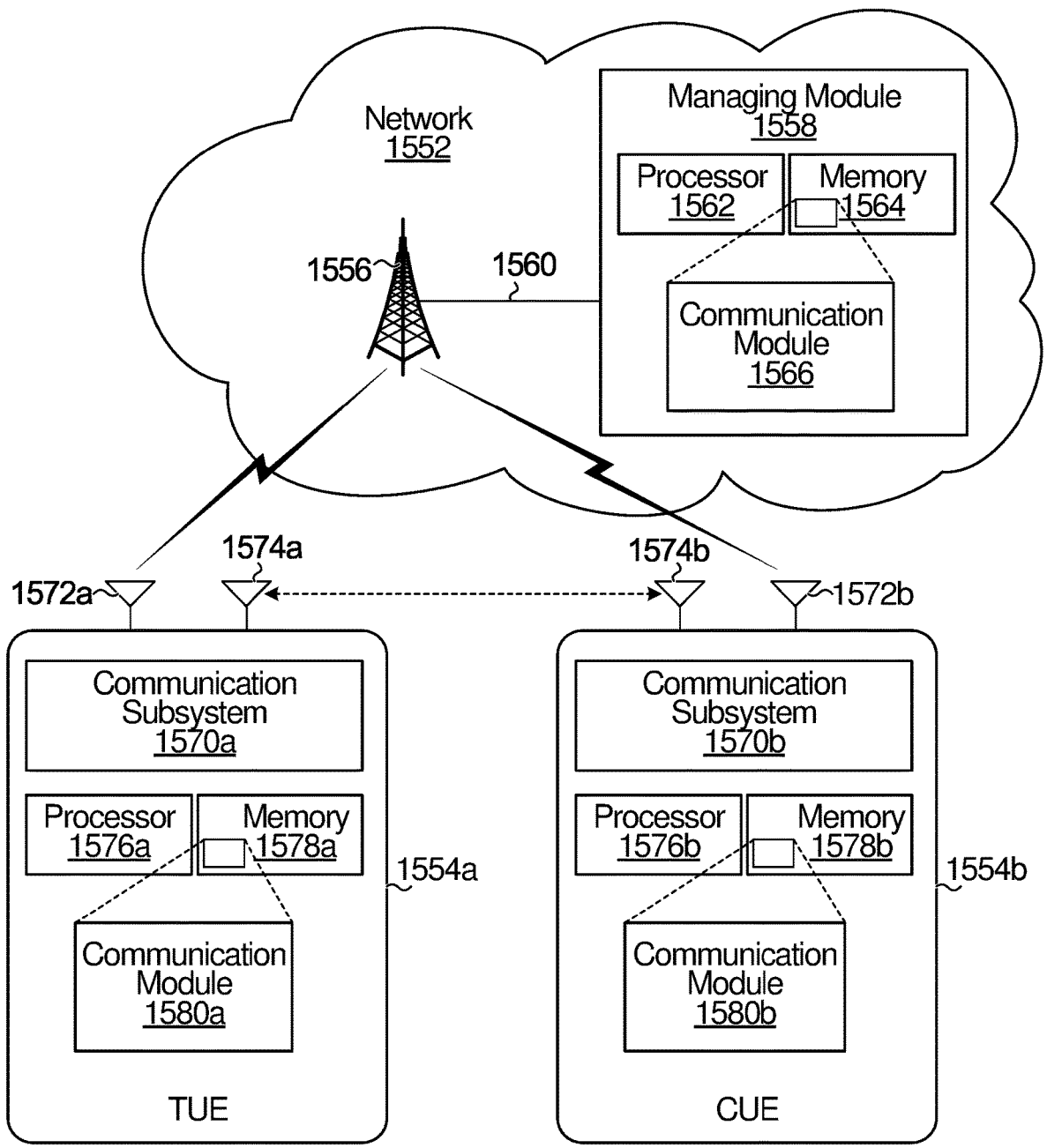
FIG. 15 is a block diagram illustrating an example of a network serving two UEs.

FIG. 15 is a block diagram illustrating an example of a network 1552 serving two UEs 1554*a* and 1554*b*, according to one embodiment. The network 1552 may be the access network 1406 from FIG. 14, and the two UEs 1554*a* and 1554*b* may be two of the four UEs 1404*a-d* in FIG. 14, or the UEs 1554*a* and 1554*b* may be UEs 1404*e* and 1404*f* in FIG. 14. However, more generally this need not be the case, which is why different reference numerals are used in FIG. 15.

The network 1552 includes a BS 1556 and a managing module 1558. The managing module 1558 instructs the BS 1556 to perform actions. The managing module 1558 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554*a* includes a communication subsystem 1570*a*, two antennas 1572*a* and 1574*a*, a processor 1576*a*, and a memory 1578*a*. The UE 1554*a* also includes a communication module 1580*a*. The communication module 1580*a* is implemented by the processor 1576*a* when the processor 1576*a* accesses and executes a series of instructions stored in the memory 1578*a*, the instructions defining the actions of the communication module 1580*a*. When the instructions are executed, the communication module 1580*a* causes the UE 1554*a* to perform the actions described herein in relation to establishing and participating in a UE group. Alternatively, the module 1580*a* may be implemented by dedicated circuitry, such as an ASIC or an FPGA.

The communication subsystem 1570*a* includes processing and transmit/receive circuitry for sending messages from and receiving messages at the UE 1554*a*. Although one communication subsystem 1570*a* is illustrated, the communication subsystem 1570*a* may be multiple communication subsystems. Antenna 1572*a* transmits wireless communication signals to, and receives wireless communications signals from, the BS 1556. Antenna 1574*a* transmits SL communication signals to, and receives SL communication signals from, other UEs, including UE 1554*b*. In some implementations there may not be two separate antennas 1572*a* and 1574*a*. A single antenna may be used. Alternatively, there may be several antennas, but not separated into antennas dedicated only to SL communication and antennas dedicated only to communicating with the BS 1556.

SL communications could be over Wi-Fi, in which case the antenna 1574*a* may be a Wi-Fi antenna. Alternatively, the SL communications could be over Bluetooth™, in which case the antenna 1574*a* may be a Bluetooth™ antenna. SL communications could also or instead be over licensed or unlicensed spectrum.

The UE 1554*b* includes the same components described above with respect to the UE 1554*a*. That is, UE 1554*b* includes communication subsystem 1570*b*, antennas 1572*b* and 1574*b*, processor 1576*b*, memory 1578*b*, and communication module 1580*b*.

The UE 1554*a* is designated as a target UE (TUE) and will therefore be called TUE 1554*a*. The UE 1554*b* is a cooperating UE and will therefore be called CUE 254*b*. The CUE 1554*b* may be able to assist with wireless communications between the BS 1556 and TUE 1554*a* if a UE group were to be established that included TUE 1554*a* and CUE 1554*b*. Other communication scenarios are also contemplated, including UE cooperation for UL cooperative transmission such as cooperative MU-MIMO as disclosed herein, for example.

UE 1554*a* may be specifically chosen as a TUE (or SUE) by the network 1552, such as by the BS 1556 or the managing module 1558. Alternatively, the UE 1554*a* may itself determine that it is to be a TUE (or SUE) and inform the network 1552 by sending a message to the BS 1556. Example reasons why UE 1554*a* may choose or be selected by the network 1552 to be a TUE (or SUE) include: low wireless channel quality between the UE 1554*a* and the BS 1556, many packets to be communicated between the BS 1556 and the UE 1554*a*, and/or the presence of a cooperating UE that is a good candidate for helping with communications between the BS 1556 and the UE 1554*a*.

UE 1554*a* need not always stay a TUE (or SUE). For example, UE 1554*a* may lose its status as a TUE (or SUE) once there is no longer a need or desire for assistance with wireless communications between UE 1554*a* and the BS 1556. UE 1554*a* may assist another TUE (or SUE) that is currently a CUE but is subsequently a TUE (or SUE) at a later time. In general, a particular UE may sometimes be a TUE, an SUE at other times, and at still other times be a CUE assisting another TUE or SUE. Also, sometimes a particular UE may be more than one of: a TUE receiving assistance from one or more CUEs for reception, an SUE receiving assistance from one or more CUEs for transmission, and a CUE itself assisting another TUE or SUE. Examples herein that refer to a UE only as a TUE, an SUE, or a CUE are only for the purpose of illustration.

FIGS. 14 and 15 illustrate systems in which embodiments could be implemented. In some embodiments, a UE includes a processor, such as 1576*a*, 1576*b* in FIG. 15, and a non-transitory computer readable storage medium, such as 1578*a*, 1578*b* in FIG. 15, storing programming for execution by the processor. A non-transitory computer readable storage medium could also or instead be provided separately, as a computer program product. Examples are provided elsewhere herein.

The present disclosure encompasses various embodiments, including the examples below.

According to an example 1, a method performed by a first UE involves transmitting, by the first UE to a second UE over an SL, data from the first UE that is to be transmitted via cooperative MIMO transmission by multiple UEs including at least the second UE in an uplink direction to network equipment in a communication network. The data is associated with an identifier for identifying the first UE to the network equipment as a source of the data transmitted by the second UE to the network equipment.

An example 2 relates to the method of example 1, further comprising: providing, by the first UE to the second UE over the SL, an explicit indication of the identifier or an implicit indication of the identifier.

An example 3 relates to the method of example 1, further comprising: transmitting, by the first UE to the second UE over the SL, an indication of the identifier.

An example 4 relates to the method of example 1, further comprising: scrambling data with a sequence associated with the identifier.

An example 5 relates to the method of any one of examples 1 to 4, further comprising: transmitting, by the first UE to the network equipment, data that is different from the data that is to be transmitted by the second UE.

An example 6 relates to the method of any one of examples 1 to 4, further comprising: transmitting, by the first UE to the network equipment, the data.

An example 7 relates to the method of any one of examples 1 to 6, further comprising: the first UE obtaining joint precoding parameters for the cooperative MIMO transmission by the first UE and the second UE.

An example 8 relates to the method of example 7, wherein the obtaining comprises receiving, as the joint precoding parameters, joint precoding parameters determined by the network equipment.

An example 9 relates to the method of example 7, wherein the joint precoding parameters comprise joint precoding parameters determined by the first UE, the second UE, or another UE in a cooperation group to which the multiple UEs belong.

An example 10 relates to the method of example 9, wherein the joint precoding parameters comprise joint precoding parameters determined by the first UE, the second UE, or the other UE, and modified by the network equipment.

An example 11 relates to the method of any one of examples 1 to 10, further comprising: transmitting over a further sidelink, by the first UE to a third UE of the multiple UEs, the data from the first UE that is to be transmitted via the cooperative MIMO transmission.

An example 12 relates to the method of any one of examples 1 to 11, wherein the cooperative MIMO transmission comprises redundant transmissions in a HARQ process.

An example 13 relates to the method of example 12, wherein the redundant transmissions comprise transmissions according to different types of UE cooperation.

An example 14 relates to the method of any one of examples 1 to 13, wherein the cooperative MIMO transmission comprises closed loop cooperative MIMO transmission.

An example 15 relates to the method of any one of examples 1 to 13, wherein the cooperative MIMO transmission comprises open loop cooperative MIMO transmission.

According to an example 16, a method performed by a first UE involves: receiving, by the first UE over an SL, data from a second UE that is to be transmitted via cooperative MIMO transmission by multiple UEs including at least the first UE in an uplink direction to network equipment in a communication network; and transmitting, by the first UE to the network equipment, the data and an identifier for identifying the second UE to the network equipment as a source of the data.

An example 17 relates to the method of example 16, wherein transmitting the identifier and the data comprises transmitting an indication of the identifier.

An example 18 relates to the method of example 16, wherein transmitting the identifier and the data comprises transmitting the data scrambled with a sequence associated with the identifier.

An example 19 relates to the method of any one of examples 16 to 18, further comprising: receiving, by the first UE from the second UE, an explicit indication of the identifier.

An example 20 relates to the method of any one of examples 16 to 18, further comprising: obtaining the identifier based on an implicit indication provided to the first UE by the second UE over the SL.

An example 21 relates to the method of any one of examples 16 to 20, further comprising: the first UE obtaining joint precoding parameters for the cooperative MIMO transmission.

An example 22 relates to the method of example 21, wherein the obtaining comprises receiving, as the joint precoding parameters, joint precoding parameters determined by the network equipment.

An example 23 relates to the method of example 21, wherein the joint precoding parameters comprise joint precoding parameters determined by the first UE, the second UE, or another UE in a cooperation group to which the multiple UEs belong.

An example 24 relates to the method of example 23, wherein the joint precoding parameters comprise joint precoding parameters determined by the first UE, the second UE, or the other UE, and modified by the network equipment.

An example 25 relates to the method of any one of examples 16 to 24, further comprising: transmitting over a further sidelink, by the first UE to a third UE of the multiple UEs, the data from the first UE that is to be transmitted via the cooperative MIMO transmission.

An example 26 relates to the method of any one of examples 16 to 25, wherein the cooperative MIMO transmission comprises redundant transmissions in a HARQ process.

An example 27 relates to the method of example 26, wherein the redundant transmissions comprise transmissions according to different types of UE cooperation.

An example 28 relates to the method of any one of examples 16 to 27, wherein the cooperative MIMO transmission comprises closed loop cooperative MIMO transmission.

An example 29 relates to the method of any one of examples 16 to 27, wherein the cooperative MIMO transmission comprises open loop cooperative MIMO transmission.

According to an example 30, a method performed by network equipment in a communication network involves: receiving, from multiple UEs, a cooperative MIMO transmission, by the multiple UEs, of source data from a source UE; obtaining, by the network equipment, an identifier for identifying the source UE to the network equipment as a source of the source data.

An example 31 relates to the method of example 30, wherein the cooperative MIMO transmission comprises components of respective different portions of the source data transmitted by each of the multiple UEs.

An example 32 relates to the method of example 30, wherein the cooperative MIMO transmission comprises components of a common portion of the source data transmitted by each of the multiple UEs.

An example 33 relates to the method of any one of examples 30 to 32, further comprising: determining, by the network equipment, joint precoding parameters for the cooperative MIMO transmission by the multiple UEs; transmitting, by the network equipment to the multiple UEs, the joint precoding parameters.

An example 34 relates to the method of example 33, further comprising: performing, by the network equipment, measurements based on further signals received from the multiple UEs, wherein the determining comprises determining the joint precoding parameters based on the measurements.

An example 35 relates to the method of example 33, further comprising: receiving, from one or more of the multiple UEs, initial joint precoding parameters based on measurements performed by each of the multiple UEs, wherein the determining comprises determining, as the joint precoding parameters, modified joint precoding parameters based on the initial joint precoding parameters.

According to an example 36, a UE comprises: a processor; and a non-transitory computer readable storage medium storing programming for execution by the processor, the programming including instructions to perform the method of any one of examples 1 to 15.

According to an example 37, a UE comprises: a processor; and a non-transitory computer readable storage medium storing programming for execution by the processor, the programming including instructions to perform the method of any one of examples 16 to 29.

According to an example 38, network equipment comprises: a processor; and a non-transitory computer readable storage medium storing programming for execution by the processor, the programming including instructions to perform the method of any one of examples 30 to 35.

According to an example 39, a computer program product comprises a non-transitory computer readable storage medium storing programming, the programming including instructions to perform the method of any one of examples 1 to 15.

According to an example 40, a computer program product comprises a non-transitory computer readable storage medium storing programming, the programming including instructions to perform the method of any one of examples 16 to 29.

According to an example 41, a computer program product comprises a non-transitory computer readable storage medium storing programming, the programming including instructions to perform the method of any one of examples 30 to 35.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and nonvolatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method performed by a first user equipment (UE), the method comprising:
    splitting or distributing source data from the first UE for cooperative transmission by multiple UEs including at least a second UE in an uplink direction to network equipment in a communication network,
    the splitting or distributing comprising transmitting, to the second UE through direct UE-to-UE communications, data that is to be transmitted to the network equipment by the second UE cooperatively with at least one other UE of the multiple UEs, wherein
    the source data comprises the data that is transmitted to the second UE, which is associated with an identifier that identifies the first UE to the network equipment as a source of the data that is to be transmitted by the second UE,
    wherein the splitting of the source data comprises splitting the source data into different data for transmission by the multiple UEs, and wherein the distributing of the source data comprises distributing same data from the source data for transmission by the multiple UEs.

2. The method of claim 1, wherein:
    the identifier is indicated to the second UE.

3. The method of claim 1, wherein the splitting of the source data further comprises:
    transmitting, to the network equipment, data that is different from the data that is to be transmitted by the second UE.

4. The method of claim 1, wherein the multiple UEs further comprise a third UE, the splitting or distributing further comprising:
    transmitting, to the third UE through direct UE-to-UE communications, data from the first UE that is to be transmitted by the third UE cooperatively with the second UE.

5. The method of claim 1, wherein the cooperative transmission comprises redundant transmissions in a hybrid automatic repeat request (HARQ) process.

6. The method of claim 1, further comprising:
    receiving, by the first UE from the network equipment, one or more joint precoding parameters for the cooperative transmission, wherein the one or more joint precoding parameters are determined by a UE and modified by the network equipment.

7. The method of claim 1, further comprising:
    transmitting, by the first UE to the network equipment, a reference signal for channel measurement by the network equipment, wherein one or more joint precoding parameters for the cooperative transmission are generated or modified by the network equipment based on at least the channel measurement.

8. The method of claim 1, further comprising:
    determining, by the first UE, one or more joint precoding parameters for the cooperative transmission.

9. The method of claim 1, further comprising:
    receiving, by the first UE from the second UE, one or more joint precoding parameters for the cooperative transmission, wherein the one or more joint precoding parameters are determined by the second UE.

10. The method of claim 1, further comprising:
    reporting, by the first UE to the second UE, a channel measurement by the first UE, wherein one or more joint precoding parameters for the cooperative transmission are determined by the second UE based on at least the channel measurement.

11. The method of claim 1, further comprising:
    determining the split or distribution based on one or more of:
    a data split or distribution that is preconfigured;
    UE cooperation group configuration information;
    a number of UEs in a cooperation group;
    a split or distribution of the source data equally among the multiple UEs in the cooperation group;
    a total number of antennas across UEs in the cooperation group;
    how much data is to be transmitted.

12. The method of claim 1, wherein the distributing of the source data comprises:
    transmitting, to the network equipment, the same data from the source data that is to be transmitted by the second UE.

13. The method of claim 1, wherein the source data is to be transmitted to the network equipment only by the multiple UEs and not by the first UE.

14. A user equipment (UE) comprising:
    a processor; and
    a non-transitory computer readable storage medium storing programming for execution by the processor, the programming including instructions to perform the method of claim 1.

15. A non-transitory computer readable storage medium storing programming for execution by the processor, the programming including instructions to perform the method of claim 1.

16. A method performed by a first user equipment (UE), the method comprising:
    receiving, through direct UE-to-UE communications, data from a second UE, the data comprising source data from the second UE that is split or distributed for cooperative transmission by multiple UEs including at least the first UE in an uplink direction to network equipment in a communication network; and
    transmitting the data to the network equipment, wherein the data is associated with an identifier that identifies the second UE to the network equipment as a source of the data,
    wherein the splitting of the source data comprises splitting the source data into different data for transmission by the multiple UEs, and wherein the distributing of the source data comprises distributing same data from the source data for transmission by the multiple UEs.

17. The method of claim 16, wherein:
    the identifier is indicated to the network equipment.

18. A user equipment (UE) comprising:
a processor; and
a non-transitory computer readable storage medium storing programming for execution by the processor, the programming including instructions to perform the method of claim 16.

19. A non-transitory computer readable storage medium storing programming for execution by the processor, the programming including instructions to perform the method of claim 16.

20. A method performed by network equipment in a communication network, the method comprising:
receiving a cooperative transmission of source data by multiple user equipments (UEs), the source data comprising source data from a source UE that is split or distributed for the cooperative transmission by the multiple UEs;
obtaining an identifier that identifies the source UE to the network equipment as a source of the source data,
wherein the splitting of the source data comprises splitting the source data into different data for transmission by the multiple UEs, and wherein the distributing of the source data comprises distributing same data from the source data for transmission by the multiple UEs.

21. The method of claim 20, wherein the cooperative transmission comprises, for the splitting of the source data, components of respective different portions of the source data transmitted by each of the multiple UEs.

22. The method of claim 20, wherein the cooperative transmission comprises, for the distributing of the source data, the same portion data of the source data transmitted by each of the multiple UEs.

23. The method of claim 20, wherein the multiple UEs comprise the source UE.

24. Network equipment comprising:
a processor; and
a non-transitory computer readable storage medium storing programming for execution by the processor, the programming including instructions to perform the method of claim 20.

25. A non-transitory computer readable storage medium storing programming for execution by the processor, the programming including instructions to perform the method of claim 20.

* * * * *

UNITED STATES PATENT AND TRADEMARK OFFICE
CERTIFICATE OF CORRECTION

PATENT NO. : 12,155,425 B2
APPLICATION NO. : 17/967217
DATED : November 26, 2024
INVENTOR(S) : Jianglei Ma et al.

Page 1 of 1

It is certified that error appears in the above-identified patent and that said Letters Patent is hereby corrected as shown below:

In the Claims

At Column 38, Line 9, Claim 22:
"data, the same portion data of the source data transmitted by..."
Should be:
-- data, the same data of the source data transmitted by... --

Signed and Sealed this
Second Day of September, 2025

Coke Morgan Stewart
*Acting Director of the United States Patent and Trademark Office*